United States Patent [19]
Katagiri et al.

[11] Patent Number: 5,430,462
[45] Date of Patent: Jul. 4, 1995

[54] IMAGE INPUT DEVICE-INTEGRATED TYPE DISPLAY DEVICE

[75] Inventors: Masayuki Katagiri, Souraku; Takao Tagawa, Kashihara; Noritoshi Kako, Nara, all of Japan

[73] Assignee: Sharp Kabushiki Kaisha, Osaka, Japan

[21] Appl. No.: 163,027

[22] Filed: Dec. 6, 1993

[30] Foreign Application Priority Data

Dec. 7, 1992 [JP] Japan .................. 4-326545

[51] Int. Cl.$^6$ .................................. G09G 3/36
[52] U.S. Cl. .................. 345/104; 345/182; 359/72
[58] Field of Search ............ 345/84, 87, 102, 173, 345/104, 179, 182, 183, 97, 44, 98; 178/18; 359/55, 72, 90, 63; 348/241, 236

[56] References Cited

U.S. PATENT DOCUMENTS

| | | |
|---|---|---|
| 4,875,036 | 10/1989 | Washizuka et al. .......... 345/173 |
| 5,243,332 | 9/1993 | Jacobson .................. 345/44 |
| 5,305,129 | 4/1994 | Fujiwara et al. ........... 359/72 |

FOREIGN PATENT DOCUMENTS

| | | |
|---|---|---|
| 0458513A1 | 11/1991 | European Pat. Off. . |
| 59-024387 | 2/1984 | Japan . |
| 60-128527 | 7/1985 | Japan . |
| 62-035935 | 2/1987 | Japan . |
| 63-9268 | 1/1988 | Japan . |
| 3-050574 | 3/1991 | Japan . |
| 3-054617 | 3/1991 | Japan . |

Primary Examiner—Richard Hjerpe
Assistant Examiner—Kent Chang
Attorney, Agent, or Firm—David G. Conlin; Robert F. O'Connell

[57] ABSTRACT

There is provided an image input device-integrated type display device concurrently having an image display function, a document image input function, and a pen input function. A common electrode of the image input device-integrated type display unit is formed on a glass plate. A segment electrode is formed on a micro lens of a glass plate. An island electrode located at each pixel is connected to the segment electrode via a photoconductor. Liquid crystals are interposed between the common electrode and the island electrode. In an image input mode, light reflected on a document is applied to the photoconductor to control a voltage applied to the liquid crystals. In a pen input mode, light from an input pen is applied to the photoconductor to control a voltage applied to the liquid crystals. In an image display mode, a voltage applied to the liquid crystals is controlled according to image data of each pixel. Thus brightness data of the document, position data of the input pen, and image data corresponding to a display signal are written into the image input device-integrated type display unit.

14 Claims, 17 Drawing Sheets

Fig.9(a) GRANDJEAN STATE
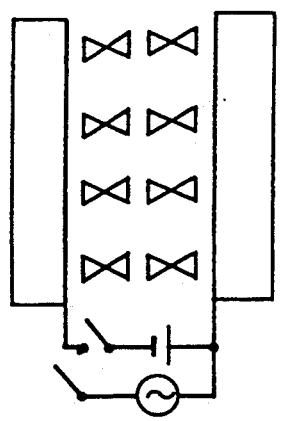
Fig.9(b) FOCALCONIC STATE
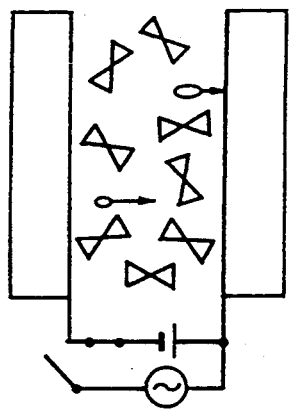
WRITE →
↑ INITIAL STATE
↓ STORAGE
Fig.9(d) GRANDJEAN STATE
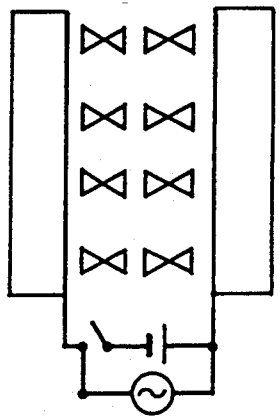
Fig.9(c) FOCALCONIC STATE
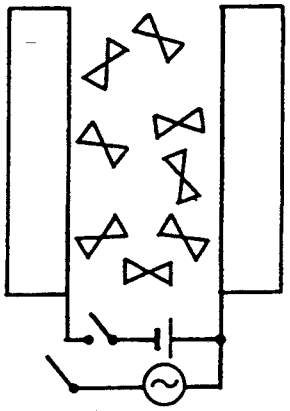
← ERASE

CONTROL LIGHT

POLARIZED ILLUMINATION LIGHT

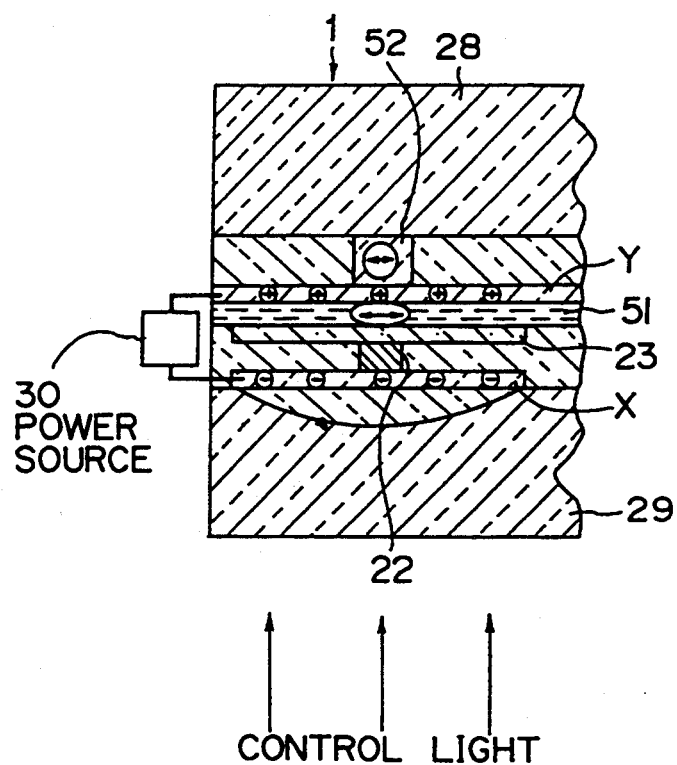
Fig.12(a)
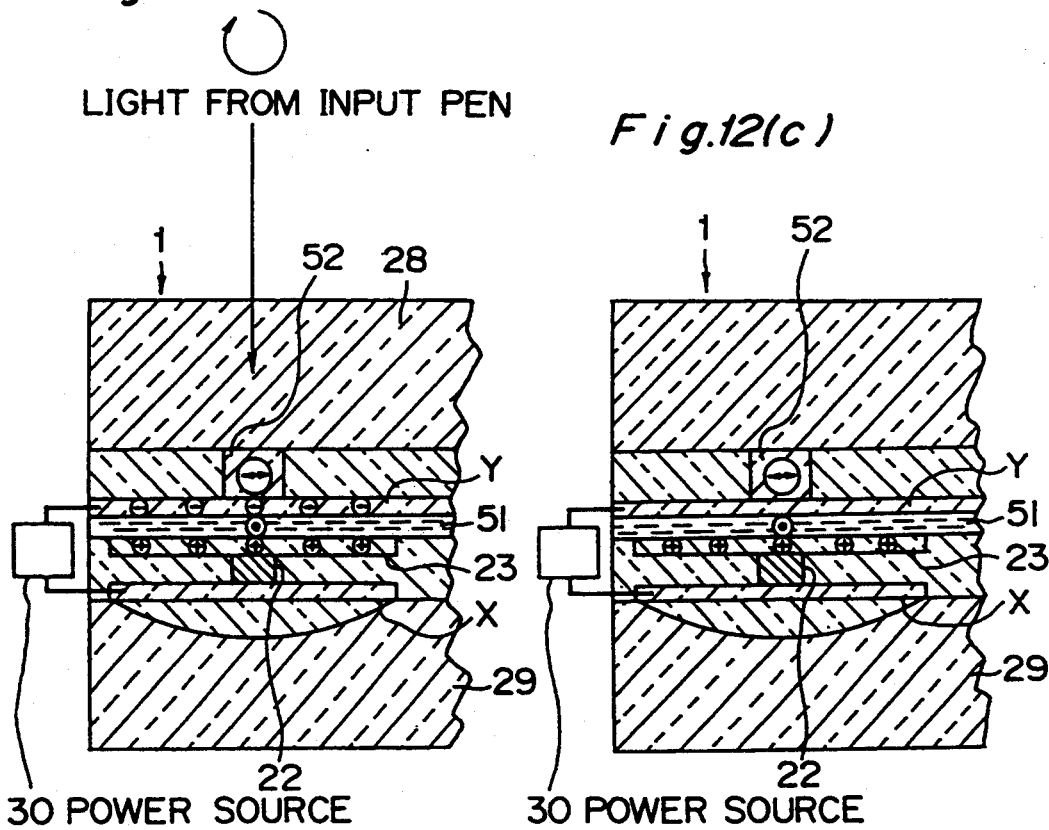
Fig.12(b)
Fig.12(c)

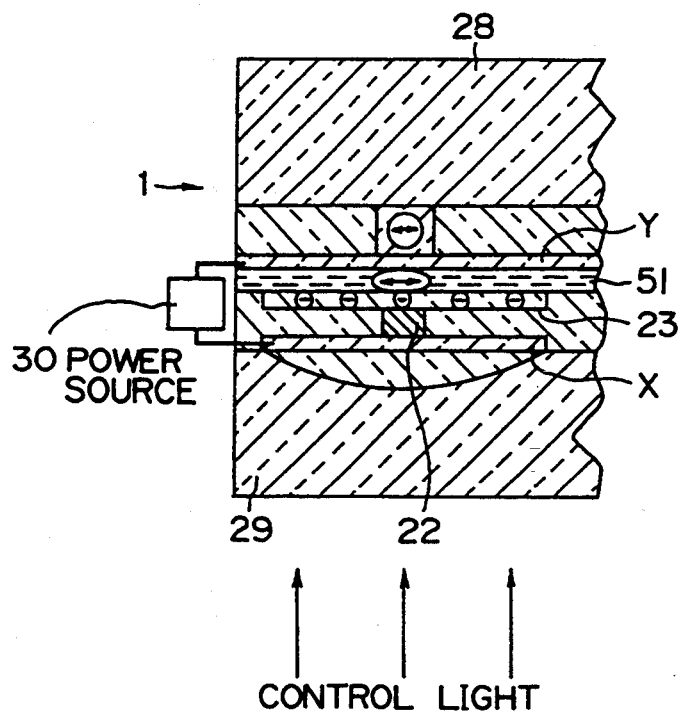
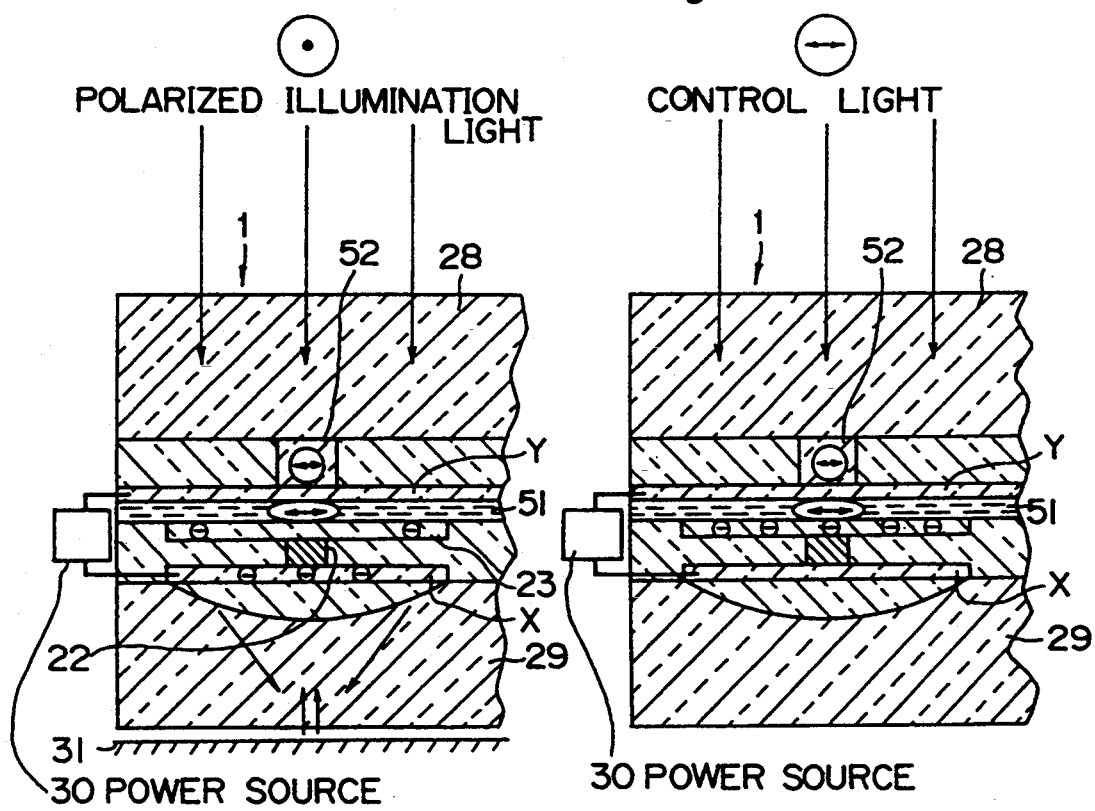

IMAGE INPUT DEVICE-INTEGRATED TYPE DISPLAY DEVICE

BACKGROUND OF THE INVENTION

1. Field of the Invention

The present invention relates to an image input device-integrated type display device for use in an information apparatus such as a personal computer, a word processor, or an electronic notebook.

2. Description of the Prior Art

Information apparatuses such as a personal computer and a word processor are demanded to be further compacted and have a higher performance. In recent years, liquid crystal display devices are increasingly used as a display unit for the information apparatuses in order to comply with the demand for compacting and reducing the weight of the apparatuses.

Besides, as a data input device for the above-mentioned information apparatuses, there are increasingly used an image scanner (for taking out an object image to be input as an electric signal) and a tablet (for designating an input position by means of a pen) other than a keyboard.

However, to constitute an apparatus having an image display function, image input function, and pen input function, there has been conventionally no way except for the method of combining independent hardware units of a display device, an image scanner, and a tablet.

When such independent hardware units are combined to constitute an apparatus, there are performed only data communications between the hardware units by means of electric signals, where the hardware units are not combined effectively and organically.

However, when independent hardware units of a display device, an image scanner, and a tablet are merely combined with each other to constitute an apparatus in a manner as described above, the resulting apparatus is inevitably dimensionally increased. Furthermore, even when the hardware units have therein common components, the components are to be redundantly used to result in significant wastefulness in terms of space and cost.

Particularly, the aforementioned image scanner is a bulky unit having a drive section, and therefore it is almost impossible to assemble an apparatus by integrating the image scanner with other hardware units.

SUMMARY OF THE INVENTION

The object of the present invention is therefore to provide a compact image input device-integrated type display device which concurrently has an image display function, a document image input function, and a pen input function.

In order to achieve the aforementioned object, there is provided an image input device-integrated type display device comprising: a display unit having a plurality of transparent segment electrodes arranged in parallel with each other on a transparent substrate; a plurality of transparent common electrodes arranged in parallel with each other on another transparent substrate, said common electrodes being perpendicular to said segment electrodes, a photoconductor electrically connected to either the segment electrode or the common electrode and arranged in a pixel composed of an area of intersection between the segment electrode and the common electrode, a transparent island electrode electrically connected to the photoconductor and arranged in between the segment electrode and the common electrode relevant to the pixel, liquid crystals interposed between the island electrode and an electrode which is one of the segment electrode and the common electrode and is not electrically connected to the photoconductor, and a light shielding film for shielding only light entering from the side of the electrode which is one of the segment electrode and the common electrode and is not electrically connected to the photoconductor so that the light does not reach the photoconductor; a display illumination light source which irradiates display illumination light in displaying an image on a pixel matrix composed of areas of intersections between the plural segment electrodes and the plural common electrodes of the display unit; a document illumination light source which irradiates document illumination light in copying an optical image of a document into the pixel matrix of the display unit; a control light source which irradiates control light for optically controlling turning-on and turning off of a voltage to be applied to liquid crystals of the display unit; a display control circuit which outputs a display signal for displaying an image on the pixel matrix of the display unit; an image input control circuit which outputs an image input signal for copying an optical image of the document into the pixel matrix of the display unit; an image read control circuit which outputs an image read signal for reading image data written in the liquid crystals of each pixel constituting the pixel matrix of the display unit in the form of an electric signal; a segment electrode drive circuit which drives the segment electrode based on the display signal from the display control circuit, the image input signal from the image input control circuit, or the image read signal from the image read control circuit; a common electrode drive circuit which drives the common electrode based on the display signal from the display control circuit, the image input signal from the image input control circuit, or the image read signal from the image read control circuit; an image data detection circuit which detects the image data written in the pixel matrix of the display unit in the form of an electric signal; and a control circuit which copies the optical image of the document into the pixel matrix by controlling the image input control circuit, the document illumination light source, and the control light source in an image input mode, reads the image data written in the pixel matrix in the form of an electric signal by controlling the image read control circuit, the image data detection circuit, and the control light source in an image read mode, and displays an image on the pixel matrix by controlling the display control circuit and the display illumination light source in an image display mode.

According to the above, at the pixel on which reflection light is incident from a white area of a document in the pixel matrix of the display unit set in the initial state under the control of a control circuit in the image input mode, the resistance of the photoconductor on which the reflection light strikes is made to have a low resistance, while a voltage is applied to the liquid crystals by the segment electrode drive circuit and the common electrode drive circuit based on the image input signal from the image input control circuit to thereby change the alignment state of the above-mentioned liquid crystals.

Thus, the optical image of the document is copied into the above-mentioned pixel matrix.

Furthermore, in the image read mode, the resistance of the photoconductor of the pixel on which the control light is incident under the control of the above-mentioned control circuit is made to have a low resistance, while a voltage based on the image read signal from the image read control circuit is applied to the segment electrode or the common electrode. Then the image data written in the above-mentioned pixel matrix are detected as an electric signal by the image data detection circuit.

Furthermore, in the image display mode, the resistance of the photoconductor of the pixel on which the display illumination light is incident under the control of the above-mentioned control circuit is made to have a low resistance, while a voltage based on the display signal from the display control circuit is applied to the aforementioned liquid crystals to thereby change the alignment state of the liquid crystals according to the above-mentioned display signal.

Thus, an image corresponding to the display signal from the above-mentioned display control circuit is written into the above-mentioned pixel matrix.

In an embodiment, phase transition type liquid crystals having a storage function are used as the liquid crystals.

According to the embodiment, in the aforementioned image input mode, the alignment state of the phase transition type liquid crystals is changed from the Grandjean state to the focalconic state and stored in the liquid crystals by the reflection light from the white area of the document to copy the optical image of the document into the above-mentioned pixel matrix. Furthermore, in the aforementioned image display mode, the alignment state of the phase transition type liquid crystals is changed into the above-mentioned Grandjean state or the focalconic state and stored in the liquid crystals according to the aforementioned display signal to write the image corresponding to the above-mentioned display signal into the above-mentioned pixel matrix.

Furthermore, the phase transition type liquid crystals exhibit a dielectric constant corresponding to the alignment state thereof. Therefore, in the aforementioned image read mode, a voltage signal which is, when a voltage is applied to one of the segment electrode and the common electrode, induced at the other electrode is detected by the aforementioned image data detection circuit to read the image data written in the pixel matrix as an electric signal.

In an embodiment, n-type cholesteric liquid crystals, liquid crystals formed by mixing n-type cholesteric liquid crystals with n-type nematic liquid crystals, or smectic-A liquid crystals having a storage function are used as the liquid crystals.

According to the embodiment, in the aforementioned image input mode, the alignment state of the n-type cholesteric liquid crystals, liquid crystals formed by mixing n-type cholesteric liquid crystals with n-type nematic liquid crystals, or smectic-A liquid crystals is changed from the Grandjean state to the focalconic state by the reflection light from the white area of the document. Furthermore, in the aforementioned image display mode, the alignment state of the n-type cholesteric liquid crystals, liquid crystals formed by mixing n-type cholesteric liquid crystals with n-type nematic liquid crystals, or smectic-A liquid crystals is changed to the Grandjean state or the focalconic state according to the above-mentioned display signal. Furthermore, in the aforementioned image read mode, a voltage signal which is, when a voltage is applied to one of the segment electrode and the common electrode, induced at the other electrode is detected by the aforementioned image data detection circuit.

There is provided an image input device-integrated type display device comprising: a display unit having a plurality of transparent segment electrodes arranged in parallel with each other on a transparent substrate; a plurality of transparent common electrodes arranged in parallel with each other on another transparent substrate, said common electrodes being perpendicular to said segment electrodes, a photoconductor electrically connected to either the segment electrode or the common electrode and arranged in a pixel composed of an area of intersection between the segment electrode and the common electrode, a transparent island electrode electrically connected to the photoconductor and arranged in between the segment electrode and the common electrode relevant to the pixel, liquid crystals interposed between the island electrode and an electrode which is one of the segment electrode and the common electrode and is not electrically connected to the photoconductor, and a polarizer for controlling a polarization direction of only light entering from a side of the electrode which is one of the segment electrode and the common electrode and is not electrically connected to the photoconductor, said light being able to reach the photoconductor when the light passed through the polarizer; a display illumination light source which irradiates display illumination light in displaying an image on a pixel matrix composed of areas of intersections between the plural segment electrodes and the plural common electrodes of the display unit; a document illumination light source which irradiates document illumination light in copying an optical image of a document into the pixel matrix of the display unit; a control light source which irradiates control light for optically controlling turning-on and turning-off of a voltage to be applied to liquid crystals of the display unit; a display control circuit which outputs a display signal for displaying an image on the pixel matrix of the display unit; an image input control circuit which outputs an image input signal for copying an optical image of the document into the pixel matrix of the display unit; an image read control circuit which outputs an image read signal for reading image data written in the liquid crystals of each pixel constituting the pixel matrix of the display unit in the form of an electric signal; a segment electrode drive circuit which drives the segment electrode based on the display signal from the display control circuit, the image input signal from the image input control circuit, or the image read signal from the image read control circuit; a common electrode drive circuit which drives the common electrode based on the display signal from the display control circuit, the image input signal from the image input control circuit, or the image read signal from the image read control circuit; an image data detection circuit which detects the image data written in the pixel matrix of the display unit in the form of an electric signal; and a control circuit which copies the optical image of the document into the pixel matrix by controlling the image input control circuit, the document illumination light source, and the control light source in an image input mode, reads the image data written in the pixel matrix in the form of an electric signal by controlling the image read control circuit, the image data detection circuit, and the control light source in an image read mode, and displays an image on the pixel matrix by controlling the display control circuit and the display illumination light source in an image display mode.

According to the above device, the polarization direction of only the light which enters from the side of the electrode which is one of the segment electrode and the common electrode of the display unit and is not electrically connected to the photoconductor is controlled by the polarizer before the light reaches the photoconductor. Therefore, the presence or absence of the light incident on the above-mentioned photoconductor from the above-mentioned electrode which is not electrically connected to the photoconductor is set by the above-mentioned polarizer.

As a result, when the operations of the above-mentioned image input mode, image read mode, and image display mode are executed in the same manner as in the aforementioned first device, the resistance of the photoconductor is also set by the light entering into the photoconductor from the electrode which is not electrically connected to the photoconductor to set the on/off condition of the voltage applied to the liquid crystals.

In an embodiment, ferroelectric liquid crystals are used as the liquid crystals.

According to the embodiment, in the aforementioned image input mode, the alignment state of the ferroelectric liquid crystals is changed from the state where they are perpendicular to (or in parallel with) the polarization direction of the polarizer to the state where they are in parallel with (or perpendicular to) the polarization direction of the polarizer by the reflection light from a white area of a document to copy the optical image of the document into the aforementioned pixel matrix. Furthermore, in the aforementioned image display mode, the alignment state of the ferroelectric liquid crystals is changed to the perpendicular state or to the parallel state according to the aforementioned display signal to write an image corresponding to the display signal into the above-mentioned pixel matrix. Furthermore, in the aforementioned image read mode, a specified voltage is applied to the above-mentioned ferroelectric liquid crystals to read the image data written in the above-mentioned pixel matrix as an electric signal by means of the image data detection circuit.

In an embodiment, the image data detection circuit detects a quantity of electric charges charged according to the image data at the island electrode of each pixel constituting the pixel matrix of the display unit, the control light source can irradiate light one by one on each electrode which is one of the segment electrode and the common electrode and is not electrically connected to the photoconductor, and the control circuit reads the image data written in pixel matrix in the form of an electric signal by detecting a quantity of electric charges charged at the island electrode of the pixel relevant to the one segment electrode or common electrode which is selected by being irradiated by light of the control light source in the image read mode.

According to the embodiment, the island electrode which is in contact with the above-mentioned ferroelectric liquid crystals is charged with electric charges corresponding in quantity to the image data. Therefore, in the aforementioned image read mode, a specified voltage is applied to the ferroelectric liquid crystals based on the image read signal from the image read control circuit to detect the quantity of electric charges charged at the island electrode at the pixel pertinent to the one segment electrode or common electrode which is selected by being subjected to irradiation of light from the control light source by the image data detection circuit.

Thus the image data written in the aforementioned pixel matrix are read as an electric signal.

In an embodiment, there is provided an input pen which has a light source and emits light from the light source outwardly through its tip end, and the control circuit controls the image input control circuit and the control light source in a pen input mode to allow an image input by means of the input pen to be written into the pixel matrix.

According to the embodiment, in the pen input mode, the pixel matrix of the display unit is set in the initial state under the control of the control circuit. Subsequently, the photoconductor of the pixel on which light directly from the light source of the input pen or reflection light is incident is made to have a low resistance, while a voltage based on the image input signal from the image input control circuit is applied to the liquid crystals to change the alignment state of the liquid crystals.

Thus, an image is written into the above-mentioned pixel matrix by the input pen.

In an embodiment, one of the two transparent substrates of the display unit is provided with a micro lens for condensing incident light thereto.

According to the embodiment, by virtue of the micro lens provided for one of the two transparent substrates of the aforementioned display unit, light which enters from the side of the transparent substrate at which the micro lens is not provided and is incident on the above-mentioned display unit is converged. Therefore, a sufficient quantity of light can be incident on the aforementioned photoconductor even when the quantity of light is reduced through reflection in, for example, the image input mode or the pen input mode.

Thus the brightness data of the document and the position data of the input pen are accurately written into the aforementioned pixel matrix.

In an embodiment, at least one of the two transparent substrates of the display unit is comprised of a plate-shaped optical fiber array where optical fibers each having a specified length are arranged two-dimensionally with axial directions of the optical fibers extended in a thickness direction of the optical fiber array.

According to the embodiment, light which is incident on the transparent substrate composed of a plate-shaped optical fiber array where optical fibers each having a specified length are arranged two-dimensionally with the axial directions of the optical fibers extended in the thickness direction of the optical fiber array travels through the above-mentioned optical fibers in the axial direction of the optical fibers. Thus the operation of each of the above-mentioned modes is executed without cross-talk between pixels nor loss in quantity of light.

In a embodiment the display illumination light source, the document illumination light source, and the control light source are comprised of one plate-shaped light source, and a side portion of the plate-shaped light source is pivotally mounted to a side portion of the display unit.

According to the embodiment, the aforementioned display unit is illuminated by the plate-shaped light source provided pivotally at a side of the display unit from the front surface or the back surface of the display unit at need. Thus the display illumination light source, the document illumination light source, and the control light source are concurrently provided by the above-mentioned one plate-shaped light source to execute the operation of each of the aforementioned modes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9(a), 9(b), 9(c) and 9(d) are diagrams for explaining a change of the state of current/electric field effect type liquid crystals;

FIGS. 12(a), 12(b) and 12(c) are diagrams for explaining an operation in a pen input mode of an image input device-integrated type display device employing ferroelectric liquid crystals;

FIGS. 13(a), 13(b) and 13(c) are diagrams for explaining an operation in a document image read mode of an image input device-integrated type display device employing ferroelectric liquid crystals;

DETAILED DESCRIPTION OF THE PREFERRED EMBODIMENTS

The following describes several embodiments of the present invention with reference to the attached drawings.

Figure 1:
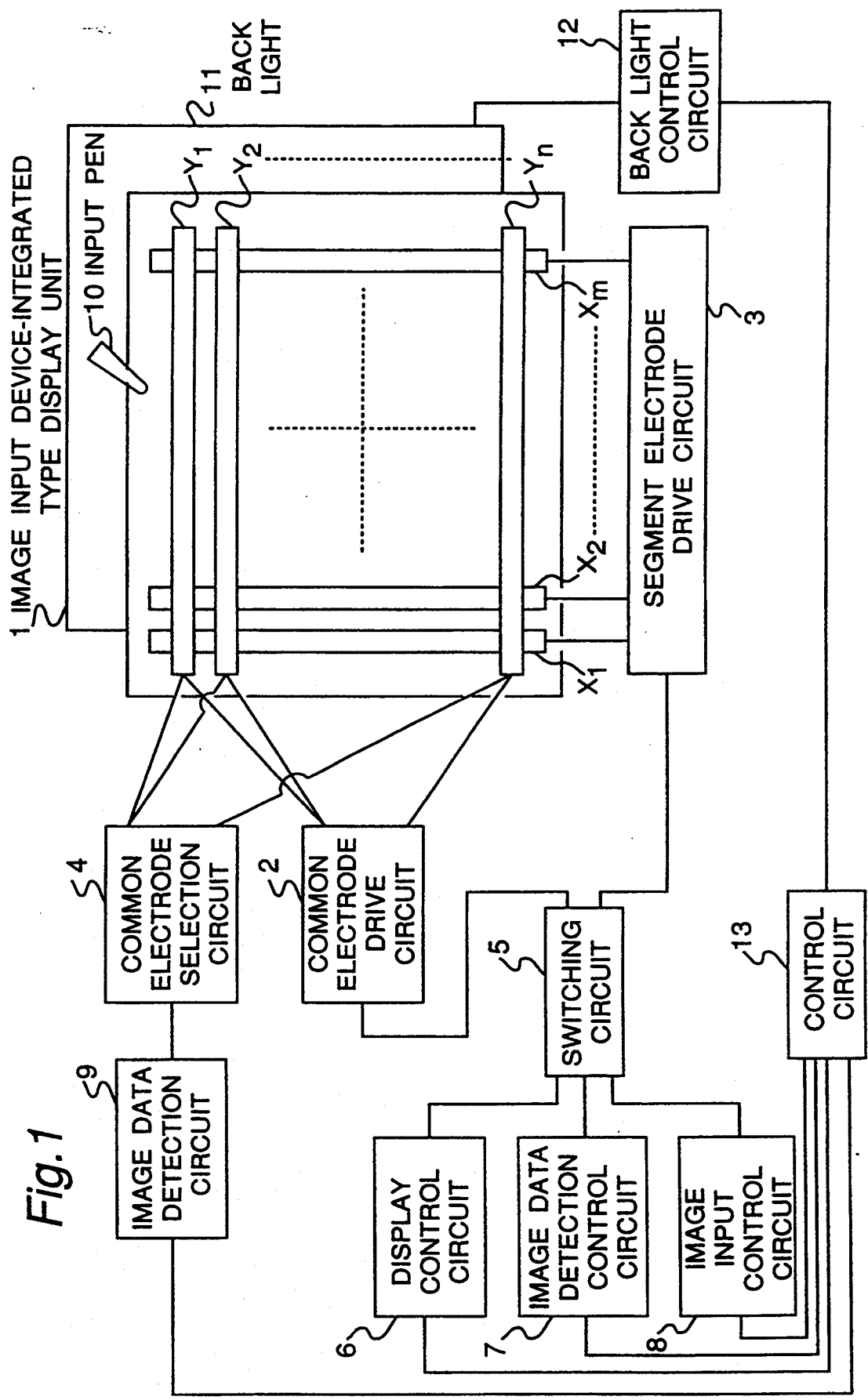
FIG. 1 is a schematic diagram of an image input device-integrated type display device in accordance with an embodiment of the present invention.

FIG. 1 is a schematic diagram of an image input device-integrated type display device of the present embodiment.

The present image input device-integrated type display device has several operation modes having the functions as follows. The operation modes are image display mode for writing an image into liquid crystals by means of an electric signal, a pen input mode for writing an image into liquid crystals by means of an input pen, an image input mode for directly copying an optical image of a document into liquid crystals, and an image read mode for reading an image written in liquid crystals in the pen input mode and the image input mode in the form of an electric signal.

Referring to FIG. 1, the above-mentioned image input device-integrated type display device comprises basically an image input device-integrated type display unit 1 composed of segment electrodes $X_1, X_2, \ldots X_m$ (each of the segment electrodes indiscriminately referred to as X hereinafter) arranged in parallel in m columns and common electrodes $Y_1, Y_2, \ldots Y_n$ (each of the common electrode indiscriminately referred to as Y hereinafter) arranged in parallel in n rows perpendicular to the segment electrode X and serving as an image input device, and a variety of peripheral circuits provided for the image input device-integrated display unit 1.

Each common electrode Y is connected to a common electrode drive circuit 2 and a common electrode selection circuit 4. On the other hand, each segment electrode X is connected to a segment electrode drive circuit 3.

A display control circuit 6 generates a display signal for displaying an image on liquid crystals interposed between the segment electrode X and the common electrode Y of the image input device-integrated display unit 1 by applying a voltage to the liquid crystals in the aforementioned image display mode. Furthermore, the display control circuit 6 generates an initialization signal for putting the above-mentioned liquid crystals into the initial state in the pen input mode or the image input mode.

An image data detection control circuit 7 generates an image read signal for reading an image written in the liquid crystals by applying a voltage to the segment electrode X of the image input device-integrated display unit 1 in the aforementioned image read mode.

An image input control circuit 8 generates an image input signal for writing an optical image of a document or a pen input image by applying a voltage to the liquid crystals by means of the segment electrode X and the common electrode Y of the image input device-integrated display unit 1 in the aforementioned image input mode or the pen input mode.

A switching circuit 5 switches between the display signal or the initialization signal from the aforementioned display control circuit 6, the image read signal from the image data detection control circuit 7, and the image input signal from the image input control circuit 8 to output the selected signal switchingly to the common electrode drive circuit 2 and the segment electrode drive circuit 3.

An image data detection circuit 9 detects a voltage induced at the common electrode Y of the image input device-integrated display unit 1 as image data in the image read mode.

An input pen 10 designates an input pixel when writing an image into the image input device-integrated display unit 1 in the pen input mode.

A back light 11 is controlled to be turned on and off and controlled of its position with respect to the image input device-integrated display unit 1 by a back light control circuit 12. The back light 11 irradiates light at need from the front or back side of the image input device-integrated display unit 1.

A control circuit 13 controls the display control circuit 6, image data detection control circuit 7, image input control circuit 8, image data detection circuit 9, and back light control circuit 12 to execute the operation in each of the image display mode, pen input mode, image input mode, and image read mode.

In more detail, the image input device-integrated display unit 1 constitutes the aforementioned display unit, and the image data detection control circuit 7 constitutes the image read control circuit.

The image input device-integrated type display device having the above-mentioned construction operates in the following manner in each of the operation modes under the control of the control circuit 13.

In the aforementioned image display mode, first the switching circuit 5 is switched to the display control circuit 6 to transmit the aforementioned display signal generated by the display control circuit 6 to the common electrode drive circuit 2 and the segment electrode drive circuit 3 via the switching circuit 5. Then the common electrode drive circuit 2 and the segment electrode drive circuit 3 scans the common electrode Y and the segment electrode X of the image input device-integrated display unit 1 to apply a voltage corresponding to the display signal to the liquid crystals of each pixel of a pixel matrix composed of the areas of intersections between the segment electrodes and the common electrodes. At the same time, the back light 11 is lit to display an image on the matrix of n×m pixels. In the above time, the polarities of the voltages applied to the segment electrode X and the common electrode Y are inverted every line or every frame in the same manner as in the general direct multiplexing matrix liquid crystal display device.

In the aforementioned image input mode, first the switching circuit 5 is switched to the display control circuit 6 side to transmit the initialization signal generated by the display control circuit 6 to the common electrode drive circuit 2 and the segment electrode drive circuit 3 via the switching circuit 5. Then the alignment state of the liquid crystals of the entire pixel matrix of the image input device-integrated display unit 1 is set in an initial state as described hereinafter.

Subsequently, the switching circuit 5 is switched to the image input control circuit 8 side to transmit the aforementioned image input signal generated by the image input control circuit 8 to the common electrode drive circuit 2 and the segment electrode drive circuit 3 via the switching circuit 5. Then a voltage for writing the optical image of a document is applied between the segment electrode X and the common electrode Y.

In the aforementioned pen input mode, first the switching circuit 5 is switched to the display control circuit 6 side to set the alignment state of the liquid crystals of the aforementioned pixel matrix in the initial state. Subsequently, the switching circuit 5 is switched to the image input control circuit 8 side to transmit the aforementioned image input signal generated by the image input control circuit 8 to the common electrode drive circuit 2 and the segment electrode drive circuit 3 via the switching circuit 5. Then a voltage for writing the position designated by the input pen 10 is applied to the segment electrodes and the common electrodes.

It is noted that the back light 11, which is not necessary in the above case, is unlighted.

In the aforementioned image read mode, the switching circuit 5 is switched to the image data detection control circuit 7 side to transmit the image read signal generated by the image data detection control circuit 7 to the segment electrode drive circuit 3 via the switching circuit 5. Then a voltage for reading an image is successively applied to each segment electrode X by the segment electrode drive circuit 3.

On the other hand, each common electrode Y is successively selected by the common electrode selection circuit 4, and an image signal induced at the selected common electrode Y is detected by the image data detection circuit 9 to be transmitted to the control circuit 13.

It is noted that the back light 11 irradiates light onto the image input device-integrated display unit 1 from behind the unit 1.

Then the following describes in detail the image input device-integrated display unit 1 which is an important component of the present invention.

Figure 2:
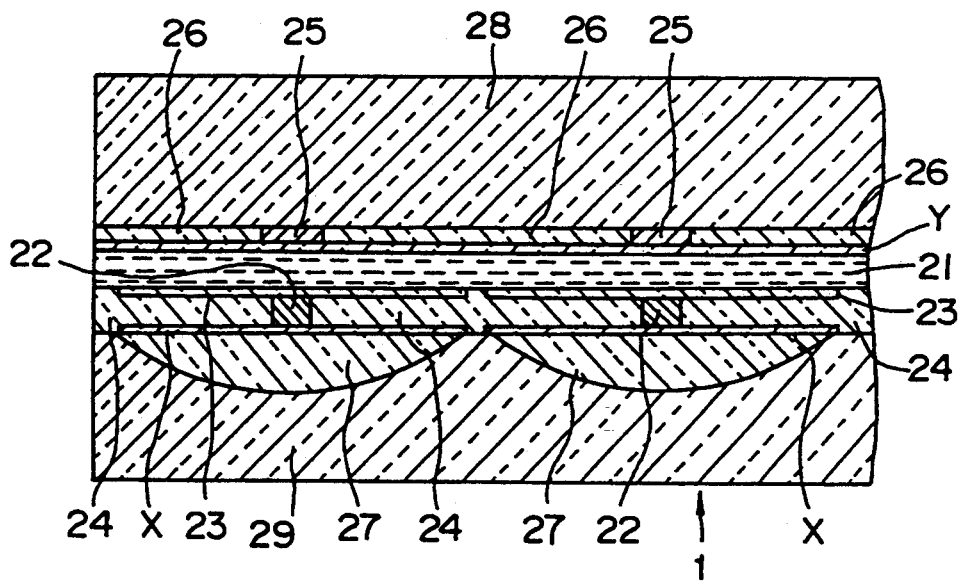
FIG. 2 is a sectional view of a part of an image input device-integrated type display device as shown in FIG. 1.

FIG. 2 is a sectional view showing a part of an image input device-integrated type display unit 1 of the present embodiment taken along the common electrode Y. Referring to FIG. 2, there are provided liquid crystals 21, photoconductors 22, and island electrodes 23. There are further provided segment electrodes X and common electrodes Y.

The above-mentioned segment electrode X, common electrode Y, and island electrode 23 are transparent electrodes made of indium tin oxide (ITO). In FIG. 2, the segment electrodes X extend in a direction perpendicular to the plane of the paper on which FIG. 2 is illustrated, and transverse cross sections of two segment electrodes X exist. On the other hand, the common electrode Y extends in a direction parallel with the plane of the paper on which FIG. 2 is illustrated, and the longitudinal section of one common electrode Y exists. Hence an area of intersection between the segment electrode X and the common electrode Y constitutes a pixel.

The aforementioned island electrode 23 is provided for each pixel, and each island electrode 23 is surrounded by a transparent insulator 24. Therefore, island electrodes 23 are electrically isolated from each other.

The aforementioned photoconductor 22 has an infinitesimal section area and is arranged in an approximate center position of each pixel. The segment electrode X and the island electrode 23 constituting each pixel are electrically connected to each other by way of the photoconductor 22. The photoconductors 22 are surrounded by the above-mentioned transparent insulator 24.

The photoconductor 22 is a material of which resistivity changes when it receives light. The photoconductor 22 is made of cadmium sulfide (CdS), cadmium telluride (CdTe), selenium (Se), zinc sulfide (ZnS), bismuth silicate crystal (BSO), amorphous silicon, organic photoconductor, or the like.

The transparent insulator 24 for electrically isolating the photoconductors 22 is made of silicon oxide ($SiO_2$), titanium oxide ($TiO_2$), or an organic material such as resist.

There is formed a light-shielding film 25 on the common electrode Y above the photoconductor 22. The light-shielding film 25 prevents incident light through a glass plate 28 from directly entering into the photoconductor 22. The light-shielding film 25 is composed of a thin film made of aluminum (Al), tungsten (W), tungsten silicide (WSi), or the like.

A transparent insulator 26 is made of silicon oxide ($SiO_2$), titanium oxide ($TiO_2$), an organic material such as resist, or rubber for the purpose to flatten the unevenness generated due to the light-shielding film 25.

Each of glass plates 28 and 29 function as a transparent substrate for encapsulating the aforementioned liquid crystals 21. Therefore, the glass plates 28 and 29 may be each made of a transparent plastic plate or a transparent ceramic plate.

In a position corresponding to each pixel on the interior surface of the glass plate 29 is formed a micro lens 27 protruding into the glass plate 29. The micro lens 27 has a function of condensing incident illumination light transmitted through the glass plate 28 and light reflected on a document, and the convergent point of the lens is located at around the exterior surface of the glass plate 29. The micro lens 27 is formed by making the glass plate 29 have a refractive index distribution or a curved surface, or by bundling optical fibers.

The aforementioned liquid crystals 21 are composed of liquid crystals which have a storage function and exhibits a change of dielectric constant thereof between a state where they display a black color and a state where they display a white color (referred to merely as "between black and white colors" hereinafter). The following describes an example employing phase transition type liquid crystals.

Figure 3:
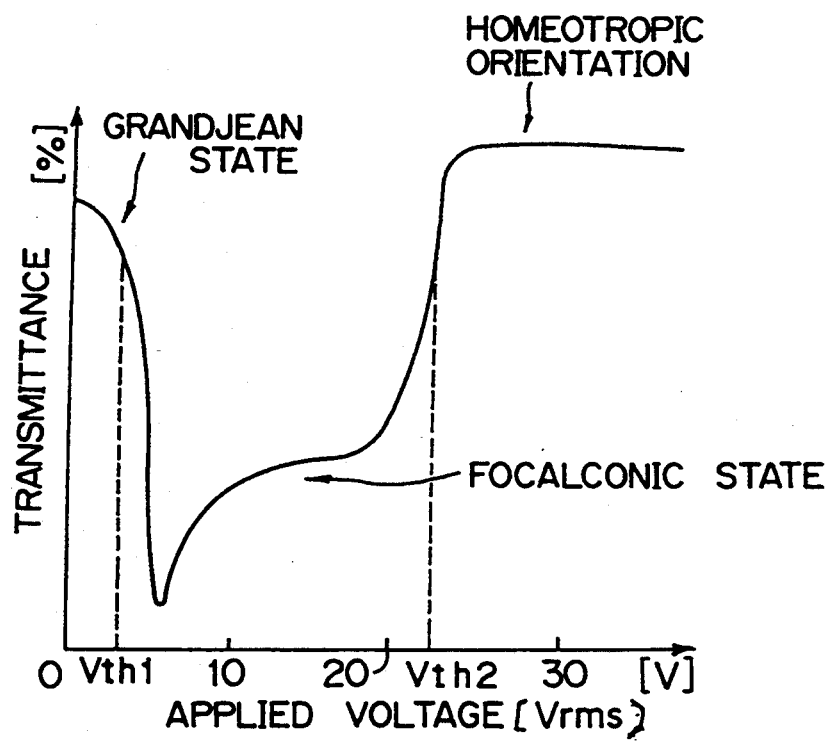
FIG. 3 is a graph showing a voltage-transmittance characteristic of phase transition type liquid crystals.

The phase transition type liquid crystals are composed of p-type cholesteric liquid crystals or liquid crystals formed by mixing p-type cholesteric liquid crystals with p-type nematic liquid crystals. FIG. 3 shows a voltage-transmittance characteristic of liquid crystals of the above-mentioned type.

Referring to FIG. 3, in an initial state where an applied voltage is lower than "Vth1", the liquid crystals are in the Grandjean state where the helical axes of the cholesteric liquid crystal molecules are aligned in a direction perpendicular to the electrode surface. In the Grandjean state, incident light perpendicular to the electrode surface is transmitted. When the applied voltage is gradually increased above "Vth1", the liquid crystals are put into the focalconic state where the directions of the helical axes which have been aligned in a direction perpendicular to the electrode surface are disordered to be directed in irregular directions. In the focalconic state, the refractive index is disordered to diffuse light, with which the liquid crystals become turbid whitely.

Then, according as the applied voltage is further increased, the helical axis pitch of the cholesteric liquid crystals increases. When the applied voltage exceeds a threshold voltage "Vth2", the liquid crystals are transformed into nematic liquid crystals where liquid crystal molecules are aligned in the direction of an electric field (i.e., a homeotropic orientation). In the homeotropic orientation, the liquid crystals are optically transparent.

It is noted that the voltage to be applied to the liquid crystals may be an AC voltage or a DC voltage.

In order to store the state of the liquid crystals as described above, the applied voltage to the liquid crystals is required to be "0". For instance, when the applied voltage is made to be "0" in the focalconic state, the focalconic state is maintained and stored. When the applied voltage is abruptly made to be "0" in the homeotropic orientation state, the liquid crystals are transformed into the Grandjean state, and the Grandjean state is maintained and stored to maintain the transparent state.

Figure 4:
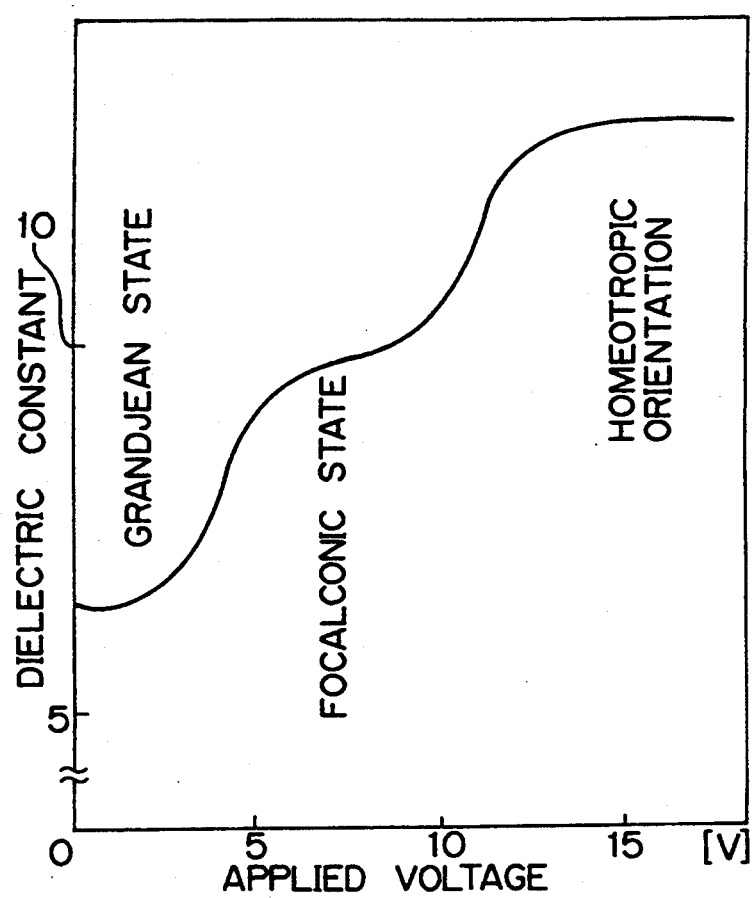
FIG. 4 is a graph showing a voltage-dielectric constant characteristic of phase transition type liquid crystals.

The above-mentioned liquid crystals are dielectric substance, and therefore the liquid crystals exhibit a dielectric polarization when an electric field is applied to the liquid crystals. FIG. 4 shows a change of dielectric constant between black and white colors corresponding to the state of the liquid crystals as shown in FIG. 3. Referring to FIG. 4, the dielectric constant increases while the liquid crystals are transformed from the Grandjean state via the focalconic state to the homeotropic orientation.

As liquid crystals which have the above-mentioned storage function and exhibit a change of dielectric constant between black and white colors, there are liquid crystals of a type which is to be subjected to a write operation by a current effect and an erasing operation by an electric field effect (the liquid crystals referred to as the "current/electric field effect type liquid crystals" hereinafter) such as n-type cholesteric liquid crystals, liquid crystals formed by mixing n-type cholesteric liquid crystals with n-type nematic liquid crystals, and smectic-A liquid crystals, and ferroelectric liquid crystals other than the above-mentioned phase transition type liquid crystals.

First Embodiment

Then the following describes the principle of operation of the image input device-integrated display unit 1 employing phase transition type liquid crystals as the liquid crystals 21 in regard to each of the aforementioned modes with reference to FIGS. 5 through 8.

(1) Image input mode (in which the optical image of a document is optically written directly into the image input device-integrated display unit)

Figure 5A:
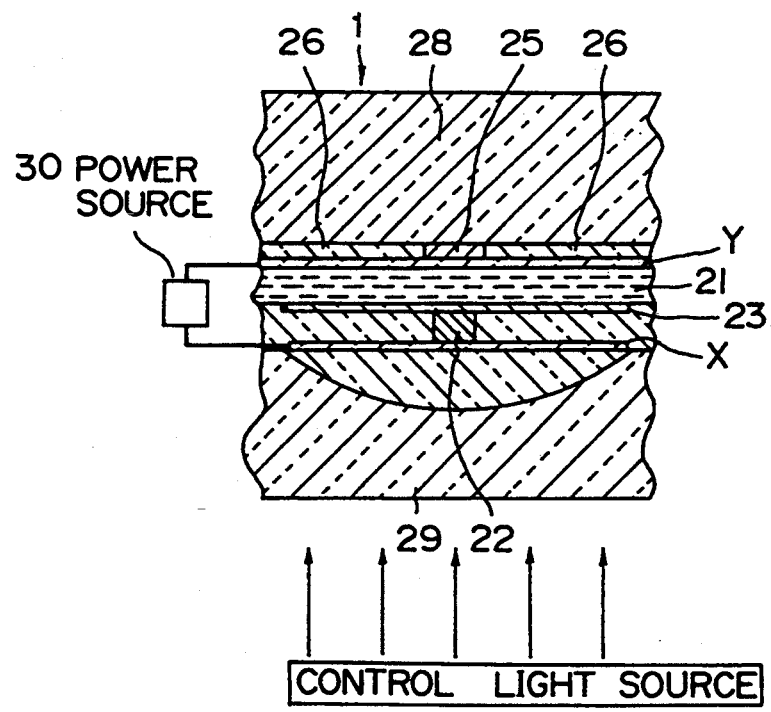
FIGS. 5(a), 5(b) and 5(c) are diagrams for explaining an operation in an image input mode of an image input device-integrated type display device employing phase transition type liquid crystals.

In a first step, the liquid crystals 21 are entirely put into a transparent state (i.e., into the aforementioned Grandjean state) (FIG. 5 (a)).

Control light is irradiated on the entire surface of the liquid crystals by the back light 11 from the side of the glass plate 29, and a voltage which is not lower than "Vth2" is applied across segment electrodes X and common electrodes Y from a power source 30 based on the aforementioned initialization signal from the display control circuit 6. In the above time, a voltage may be successively applied to each segment electrode X and each common electrode Y, or simultaneously applied to all the segment electrodes X and all the common electrodes Y.

Thus the photoconductor 22 is made to have a low resistance by the incident light from the side of the glass plate 29, with which the segment electrode X and the island electrode 23 connected to the photoconductor 22 are made to have an approximately equal potential. Consequently, a voltage approximately equal to the voltage "Vth2" supplied from the power source 30 (the voltage is slightly reduced by a voltage drop due to the photoconductor 22) is applied to the liquid crystals 21, with which the liquid crystals 21 are put into the homeotropic orientation.

Subsequently, when the voltage applied across the above-mentioned segment electrode X and the common electrode Y is abruptly made to be "0", the liquid crystals 21 are restored from the homeotropic orientation to the Grandjean state to maintain a transparent state. Then the control light from the side of the glass plate 29 is turned off.

Thus the liquid crystals 21 are entirely put into a transparent state to put the liquid crystals 21 into the initial state before image input.

Figures 5B, 5C:
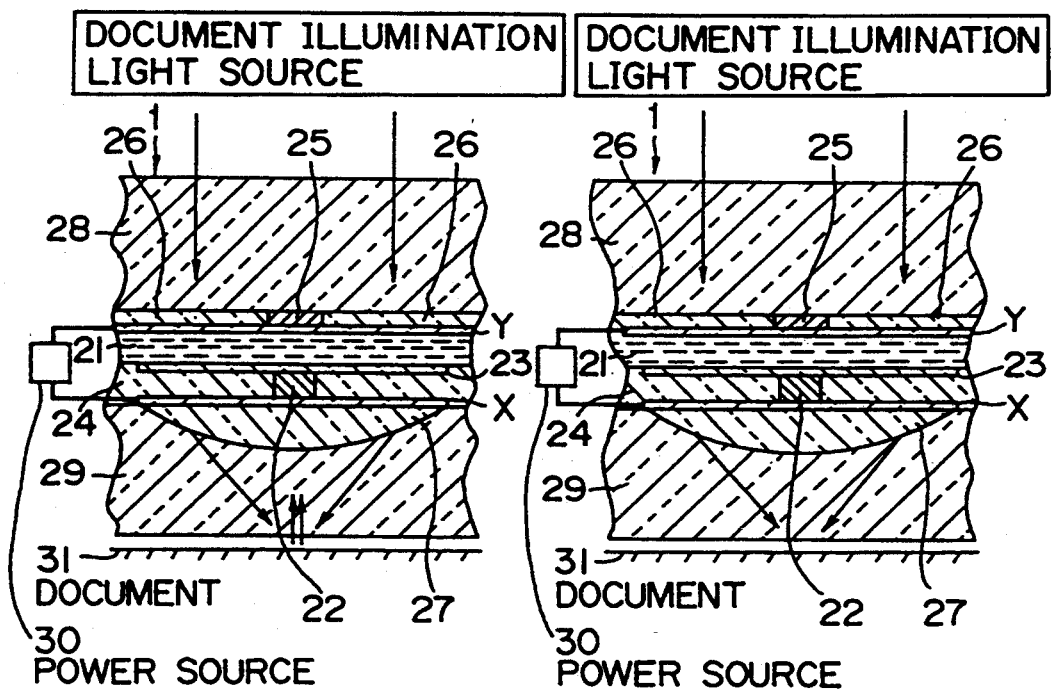

In a second step, reflection light from a document 31 is copied into the liquid crystals 21 (refer to FIGS. 5(b) and 5(c)).

The document 31 is placed under the glass plate 29 with the document substantially closely fit to the glass plate 29. Based on an image input signal from the image input control circuit 8, a voltage which is not lower than "Vth1" and lower than "Vth2" is applied across each segment electrode X and each common electrode Y from the power source 30. In the above time, a voltage may be successively applied to each segment electrode X and each common electrode Y, or simultaneously applied to all the segment electrodes X and all the common electrodes Y.

Then document illumination light is irradiated on the entire surface of the glass plate 28 by the back light 11 from the glass plate 28 side. Since the liquid crystals 21 have been already made to be transparent in the aforementioned first step, the document illumination light incident on the glass plate 28 reaches the micro lens 27 by way of the transparent insulator 26, common electrode Y, liquid crystals 21, island electrode 23, transparent insulator 24, and segment electrode X except for the area of the light-shielding film 25. Then the light is converged on the document 31 by the micro lens 27.

In the case where the convergence light strikes on a white area of the document 31, the light is reflected on the white area as shown in FIG. 5(b). A part of the reflection light is transmitted through the segment electrode X to be incident on the photoconductor 22.

Then the photoconductor 22 on which the light strikes is made to have a low resistance, with which the segment electrode X and the island electrode 23 connected to the photoconductor 22 are made to have an approximately equal potential.

Consequently, a voltage approximately equal to the voltage which is not lower than "Vth1" and lower than "Vth2" applied across the segment electrode X and the common electrode Y is applied across the island electrode 23 and the common electrode Y. Therefore, the liquid crystals 21 constituting the pixels in the area of the photoconductor 22 on which the light strikes are transformed from the initial Grandjean state into the focalconic state to be turbid whitely.

In other words, the white area of the document 31 is invertedly written into the liquid crystals 21 as a black area.

In contrast to the above, in the case where the convergence light strikes on a black area of the document 31, no light is reflected on the black area as shown in FIG. 5(c), and therefore no light strikes on the photoconductor 22. Therefore, the photoconductor 22 on which no light strikes remains having a high resistance.

In the above case, by setting the resistance of the photoconductor 22 in condition where no light strikes on it (the resistance in this condition referred to as the "dark resistance" hereinafter) at a value sufficiently higher than the resistance of the liquid crystals 21, almost no voltage is applied across the island electrode 23 and the common electrode Y because of a significant voltage drop across the segment electrode X and the island electrode 23.

Consequently, a voltage which is lower than "Vth1" is applied across the island electrode 23 and the common electrode Y. Therefore, the liquid crystals 21 constituting the pixels in the area of the photoconductor 22 on which no light strikes maintain the initial Grandjean state to be transparent.

In other words, the black area of the document 31 is invertedly written into the liquid crystals 21 as a white area.

Thus in the image input mode, a negative image of the document 31 is written into the matrix of n × m pixels of the image input device-integrated display unit 1.

In order to store the optical image of the document 31 which has thus written in the pixel matrix of the image input device-integrated display unit 1 into the liquid crystals 21, the voltage applied across the segment electrode X and the common electrode Y from the power source 30 is required to be "0", and the document illumination light is required to be removed.

The image input mode is described above by exemplifying the case where the optical image of the document 31 is stored into the liquid crystals 21 by means of the reflection light from the document 31. However, the image input device-integrated display unit 1 of the present embodiment can store the optical image of the document 31 into the liquid crystals 21 by means of a transmission light from a transparent document.

The following describes the image input mode using a transparent document.

In order to write the optical image of the transparent document into the liquid crystals 21, the transparent document is placed under the glass plate 29, and document illumination light is radiated by the back light 11 from under the transparent document. In the above case, either a negative image or a positive image of the document can be written into the aforementioned pixel matrix.

In the case where the negative image is written, a voltage which is not lower than "Vth1" and lower than "Vth2" is applied across the segment electrode X and the common electrode Y from the power source 30 with the initial state set in the Grandjean state in the same manner as in the aforementioned case where the optical image of the document 31 is stored into the liquid crystals 21 by means of the reflected light from the document 31.

A part of light transmitted through a transparent portion of the transparent document is transmitted through the segment electrode X to strike on the photoconductor 22. Consequently, a voltage approximately equal to the voltage which is not lower than "Vth1" and lower than "Vth2" and is applied across the segment electrode X and the common electrode Y is applied to the liquid crystals 21, with which the liquid crystals 21 constituting the pixels in the area of the photoconductor 22 on which the light strikes are transformed from the initial Grandjean state to the focalconic state to be turbid whitely.

In other words, the transparent area of the above-mentioned transparent document is invertedly written and stored into the liquid crystals 21 as a black area.

In contrast to the above, the photoconductor 22 which is shielded from the document illumination light by an opaque portion of the document remains having a high resistance. Consequently, a voltage which is lower than "Vth1" is applied to the liquid crystals 21, while the liquid crystals 21 constituting the pixels in the area of the photoconductor 22 on which no light strikes maintain the initial Grandjean state to be transparent.

In other words, the opaque area of the above-mentioned transparent document is invertedly written and stored into the liquid crystals 21 as a white area.

Thus the negative image of the above-mentioned transparent document is written into the pixel matrix of the image input device-integrated display unit 1.

Then the following describes the case where the aforementioned positive image is written.

In order to write the positive image, a voltage which is not lower than "Vth2" is applied across the segment electrode X and the common electrode Y from the power source 30 with the initial state set in the focal-conic state (where the liquid crystals are turbid whitely).

Then a part of light transmitted through a transparent portion of the above-mentioned transparent document is transmitted through the segment electrode X to strike on the photoconductor 22. Consequently, a voltage approximately equal to the voltage which is not lower than "Vth2" and is applied across the segment electrode X and the common electrode Y is applied to the liquid crystals 21, with which the liquid crystals 21 constituting the pixels in the area of the photoconductor 22 on which the light strikes are transformed from the initial focalconic state to the homeotropic orientation to be transparent.

In other words, the transparent area of the above-mentioned transparent document is written and stored into the liquid crystals 21 as a white area.

In contrast to the above, the photoconductor 22 which is shielded from the document illumination light by an opaque portion of the above-mentioned transparent document remains having a high resistance. Consequently, a voltage which is lower than the "Vth2" is applied to the liquid crystals 21. In the above case, by setting the dark resistance of the photoconductor 22 at a value such that the voltage across the island electrode 23 and the common electrode Y is not lower than "Vth1" and lower than "Vth2", a voltage which is not lower than "Vth1" and lower than "Vth2" and is applied to the liquid crystals 21.

Therefore, the liquid crystals 21 constituting the pixels in the area of the photoconductor 22 which is shielded from the document illumination light maintain the initial focalconic state to be turbid whitely.

In other words, the opaque area of the above-mentioned transparent document is written and stored into the liquid crystals 21 as a black area.

Thus the positive image of the above-mentioned transparent document is written into the pixel matrix of the image input device-integrated display unit 1.

It is noted that the light-shielding film 25 is not necessary when the optical image of the above-mentioned transparent document is written into the pixel matrix of the image input device-integrated display unit 1.

The control light and the document illumination light in the case where the optical image of the document 31 is stored into the liquid crystals 21 by means of the reflection light from the document 31 are obtained by moving the back light 11 on the side of the glass plate 28 or on the side of the glass plate 29 of the image input device-integrated display unit 1 as described in detail hereinafter.

(2) Pen input mode (in which an image is written into the image input device-integrated display unit by means of an input pen which emits light)

Figure 6:
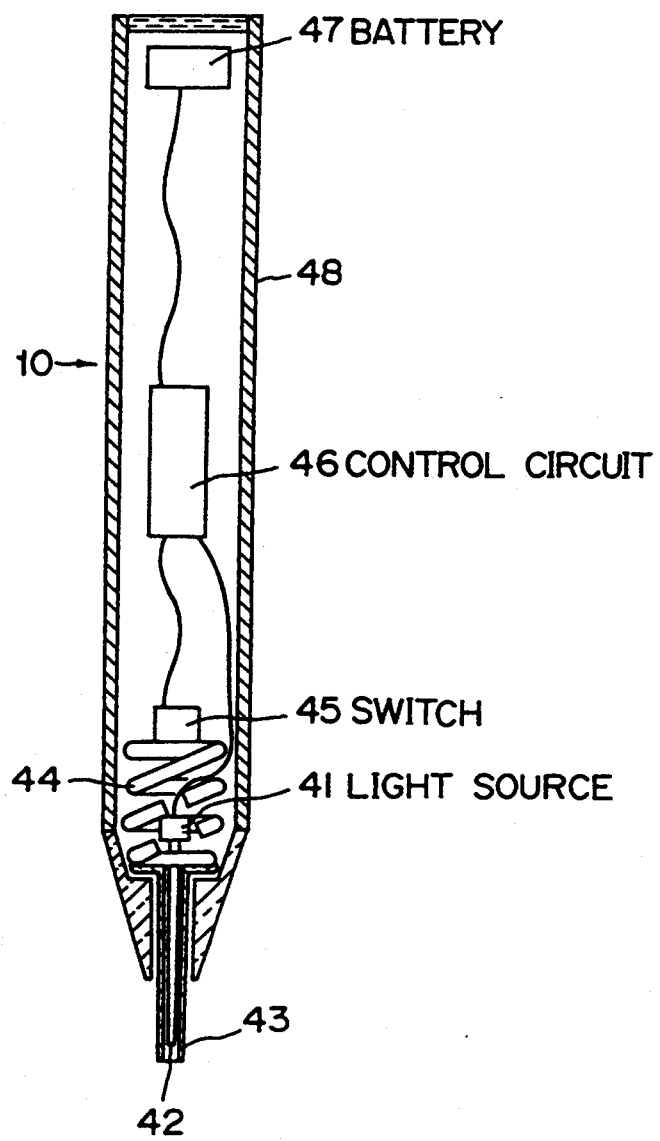
FIG. 6 is a longitudinal section view of an input pen as shown in FIG. 1.

FIG. 6 shows a sectional view of the above-mentioned input pen 10. The input pen has a built-in light source 41 composed of an LED (Light-Emitting Diode), a semiconductor laser, an EL (Electro Luminescence), or the like. Light emitted from the light source 41 is conducted to the tip of the pen by way of a photoconducting path 42 composed of a plastic fiber or the like. The photoconducting path 42 is covered with a sleeve 43, where the tip of the sleeve 43 is slightly protruding from the tip of the photoconducting path 42.

An axially inward end of the sleeve 43 is fitted to an end of a spring 44. The other end of the spring 44 is put in contact with a pen touch switch 45. With the above-mentioned arrangement, when the tip of the input pen 10 (i.e., the tip of the sleeve 43) is pressed, the pen touch switch 45 is turned on to be able to discriminate whether the operator is in an input operation.

A pen control circuit 46 makes the light source 41 emit light by transmitting a light source control signal upon reception of an "on signal" (referred to as a "touch signal" hereinafter) from the pen touch switch 45. It is noted that a power is supplied from a small-size battery 47 to the pen control circuit 46.

A casing 48 has a cylindrical configuration to serve as an exterior wall which supports the sleeve 43 with its conical end portion and fixes the above-mentioned light source 41, spring 44, pen touch switch 45, pen control circuit 46, and small-size battery 47.

The pen input mode operation is executed in the same manner as in the case where the optical image in the white area of the document 31 is written into the liquid crystals. The following describes the operation with reference to FIG. 5(b).

After the liquid crystals 21 of the image input device-integrated display unit 1 are put into an initial state (Grandjean state: transparent state), a voltage which is not lower than "Vth1" and lower than "Vth2" is applied across the segment electrode X and the common electrode Y from the power source 30 based on the image input signal from the image input control circuit 8. On the other hand, a white sheet is placed under the glass plate 29 with the sheet substantially closely fit to the glass plate 29.

Now the tip of the input pen 10 is placed in an area on the glass plate 28 corresponding to the write pixels of the pixel matrix of the image input device-integrated display unit 1, and then the casing 48 of the input pen 10 is pressed against the glass plate 28. By so doing, the pen touch switch 45 is turned on to make the light source 41 emit light.

Then, the light conducted from the light source 41 to the photoconducting path 42 is emitted from the tip of the sleeve 43 to enter into the image input device-integrated display unit 1. The light which is converged by the micro lens 27 and transmitted through the image input device-integrated display unit 1 is reflected on the white sheet to strike on the photoconductor 22. Consequently, the resistance of the photoconductor 22 is reduced, and a voltage which is not lower than "Vth1"

and lower than "Vth2" is applied to the liquid crystals 21 constituting the relevant pixel to thereby transform the liquid crystals 21 into the focalconic state (where the liquid crystals are turbid whitely).

Subsequently, when the input pen 10 is moved out of the relevant pixel area or the input pen 10 is put apart from the image input device-integrated display unit 1 to turn off the pen touch switch 45, no light is incident on the relevant pixel to make the resistance of the photoconductor 22 be the dark resistance. Consequently, a great voltage drop takes place at the photoconductor 22, with which the voltage applied to the liquid crystals 21 is made to be "0".

Thus the liquid crystals 21 in the relevant pixel area put in the focalconic state by the pen input maintain the focalconic state. In other words, dark data are written into the liquid crystals 21 in the relevant pixel area by the pen input.

By drawing a character or a figure on the image input device-integrated display unit 1 by means of the input pen in the above-mentioned manner, the character or figure is written into the pixel matrix.

In the above case, by time-sharingly processing the above-mentioned pen input mode and the image read mode described in detail hereinafter, the coordinates of the pixel currently designated by the input pen 10 can be detected.

In the above-mentioned pen input mode, a part of image already written in the pixel matrix of the image input device-integrated display unit 1 can be erased.

In order to do so, a voltage which is not lower than "Vth2" is applied across the segment electrode X and the common electrode Y from the power source 30. By tracing the line which is desired to be erased by means of the input pen 10, the liquid crystals 21 in the relevant pixel area in which the dark data pertinent to the objective line to be erased are written is transformed from the focalconic state to the homeotropic orientation.

Thus the dark data written in the liquid crystals 21 in the relevant pixel area are rewritten into light data to erase the objective line to be erased.

(3) Image read mode (in which an image written in the image input device-integrated display unit is read as an electric signal)

Figure 7:
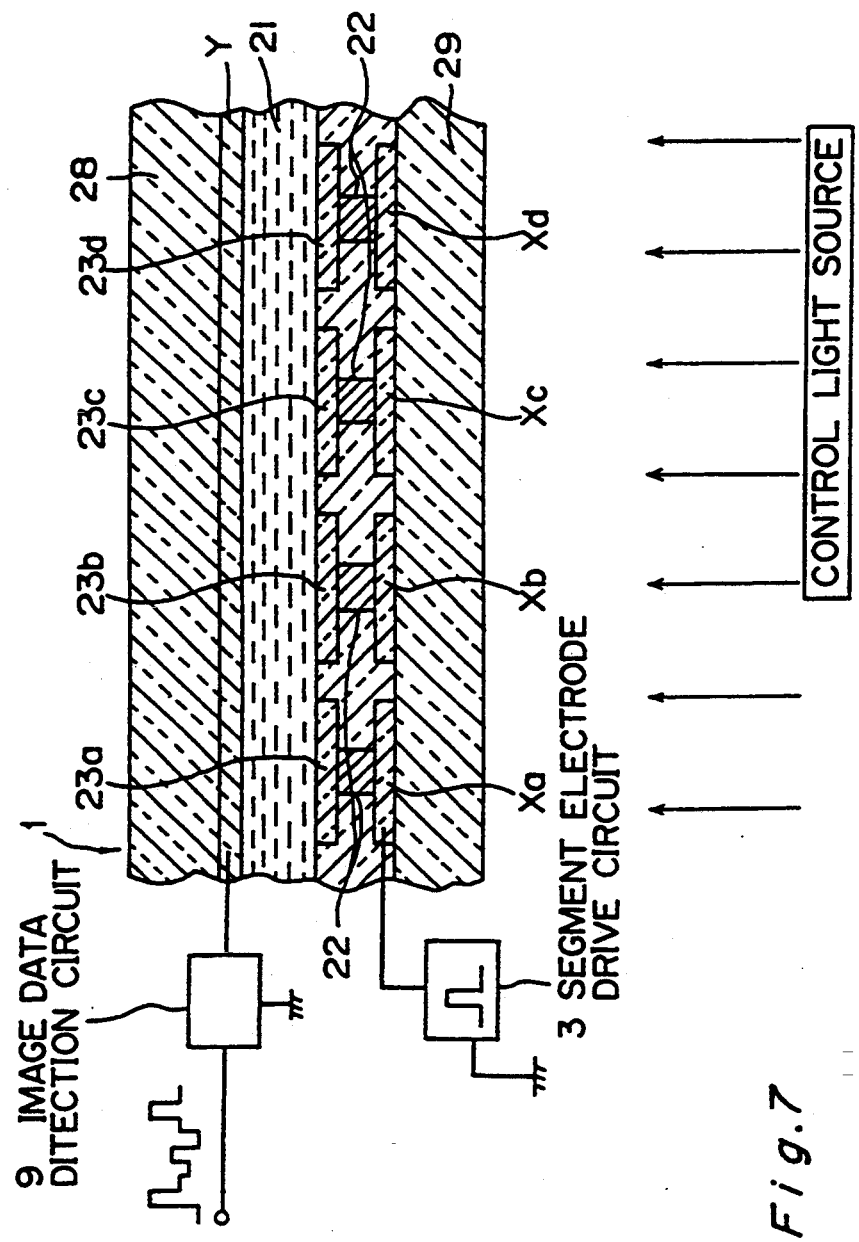
FIG. 7 is a diagram for explaining an operation in an image read mode of an image input device-integrated type display device employing phase transition type liquid crystals.

FIG. 7 is a schematic sectional view of the above-mentioned image input device-integrated display unit 1, where elements irrelevant to the image read mode are eliminated.

The liquid crystals 21 of the pixels constituting the pixel matrix of the image input device-integrated display unit 1 are in the Grandjean state, focalconic state, or a state between them according to the brightness data written in the image input mode or the pen input mode.

Control light is irradiated by the back light 11 from the side of the glass plate 29. Then the incident light strikes on the photoconductor 22 to make the photoconductor 22 have a low resistance.

In the above-mentioned condition, each segment electrode X is successively scanned by successively applying pulses of a voltage which is not higher than "Vth1" to the segment electrodes ..., $X_a$, $X_b$, $X_c$, $X_d$, ... by means of the segment electrode drive circuit 3 based on image read data from the image data detection control circuit 7. Since the photoconductor 22 has a low resistance in the above case, island electrodes ... 23a, 23b, 23c, 23d, ... connected to the segment electrode X via each photoconductor 22 are scanned by the pulses of the voltage which is not higher than "Vth1".

Thus the pulses of the voltage which is not higher than "Vth1" are successively applied to the liquid crystals 21 of pixels in each column of the aforementioned pixel matrix, where the alignment state of the liquid crystals 21 is not changed by the voltage.

The common electrode Y and the island electrode 23 arranged with interposition of the liquid crystals 21 being a dielectric substance are electrostatically coupled. Therefore, a voltage is induced at the common electrode Y due to the pulse voltage applied to the island electrode 23. In the above case, the magnitude of the induction voltage corresponds to the electrostatic capacitance across the island electrode 23 and the common electrode Y. In other words, the greater the electrostatic capacitance across the island electrode 23 and the common electrode Y is, the greater the voltage induced at the common electrode Y will be.

Since the distance between the island electrode 23 and the common electrode Y is constant, the electrostatic capacitance across the island electrode 23 and the common electrode Y varies according to the dielectric constant of the liquid crystals 21. The dielectric constant of the liquid crystals 21 varies according to the alignment state of the liquid crystal molecules as shown in FIG. 4. According to the alignment state of the liquid crystal molecules, the brightness condition to be written is determined. Therefore, the alignment state (i.e., brightness condition) of the liquid crystals 21 can be detected by detecting the voltage induced at the common electrode Y. The voltage signal induced at the common electrode Y is amplified and shaped by the image data detection circuit 9.

Thus the brightness data written into each pixel of the pixel matrix of the image input device-integrated display unit 1 are read as an induction voltage at the common electrode Y.

Specifically, a voltage which is not higher than "Vth1" is successively applied to the segment electrodes $X_1$ through $X_m$ by means of the segment electrode drive circuit 3 in the period when the common electrode $Y_1$ is selected by the common electrode selection circuit 4 as shown in FIG. 1 to transmit the time series of the read induction voltage pertinent to all the pixels of the common electrode $Y_1$ to the image data detection circuit 9.

When the brightness data of the pixels in the 1st row and m columns are read in the above-mentioned manner, the common electrode $Y_2$ is selected by the common electrode selection circuit 4 and a voltage which is not higher than "Vth1" is applied to the segment electrodes $X_1$ through $X_m$ by means of the segment electrode drive circuit 3 to read the brightness data of the pixels in the 2nd row and m columns.

The above-mentioned operation is repeated to read the brightness data (i.e., image data) of the matrix of pixels in n rows and m columns as an electric signal.

Although the control light is irradiated from the side of the glass plate 29 in order to make the photoconductor 22 have a low resistance in the example described above, such a measure is not always required to be taken.

When the above measure is not taken, the electrostatic capacitance which generates the induction voltage at the common electrode Y is a synthetic electrostatic capacitance formed by successively connecting the electrostatic capacitance across the segment electrode X and the island electrode 23 with the electrostatic capacitance across the island electrode 23 and the common electrode Y. Therefore, the induction voltage generated at the common electrode Y depending on the alignment state of the liquid crystals 21 constituting each pixel exhibits a reduced variance in level and an increased irrelevant DC component voltage.

Because of a great voltage drop due to the dark resistance of the photoconductor 22, a voltage which is not lower than "Vth1" can be applied across the segment electrode X and the common electrode Y to allow the reduction of variance in level to be suppressed to some extent.

(4) Image display mode (in which an image is written into the image input device-integrated display unit by means of an electric signal)

The operation in the present mode is the same as in the image display mode of the conventional liquid crystal display.

Figure 8:
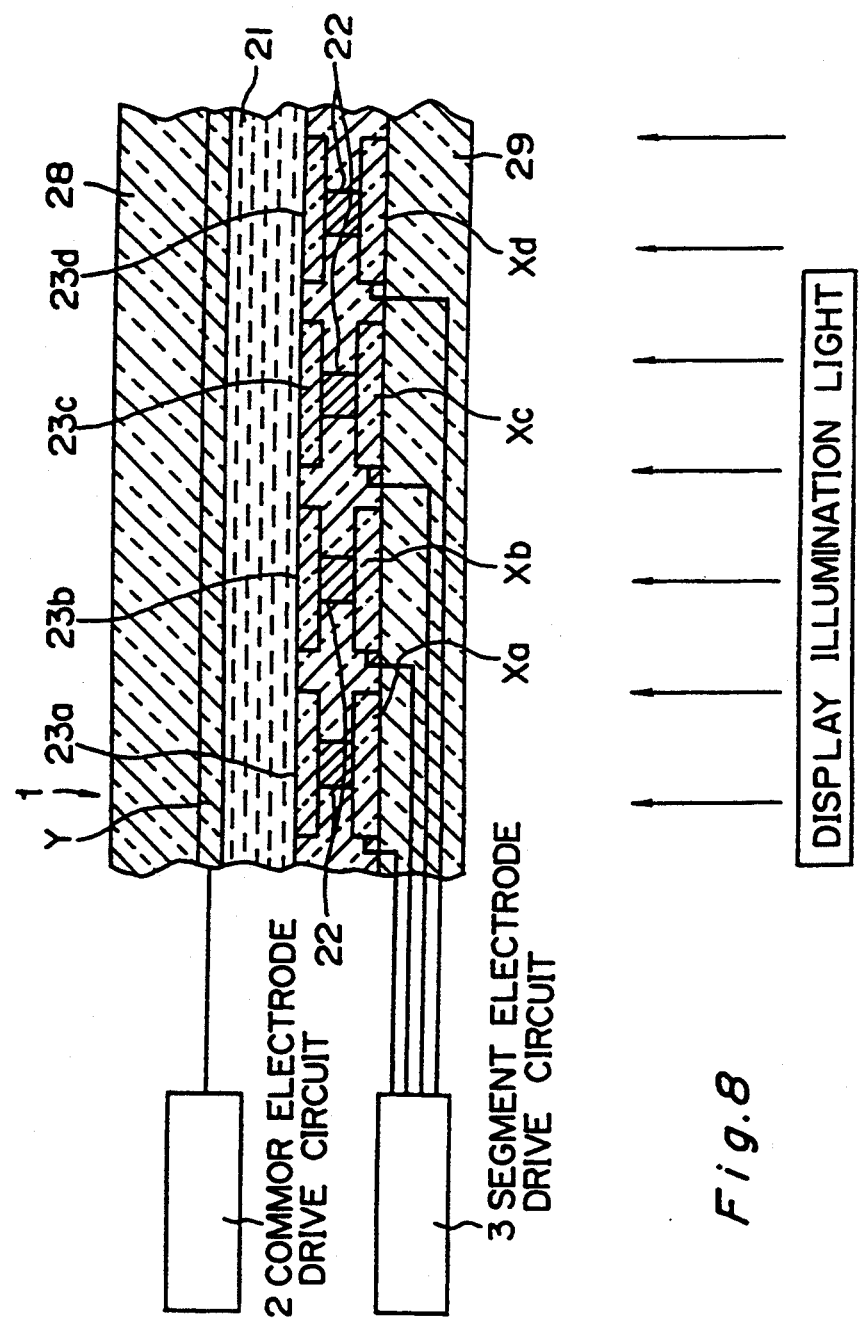
FIG. 8 is a diagram for explaining an operation in an image display mode of an image input device-integrated type display device employing phase transition type liquid crystals.

FIG. 8 shows a schematic sectional view of the image input device-integrated display unit 1, where elements irrelevant to the image display mode are eliminated.

Illumination light is irradiated by the back light 11 from the side of the glass plate 29. Then the incident light strikes on the photoconductor 22 to make the photoconductor 22 have a low resistance, with which the island electrode 23 and the segment electrode X are made to have an approximately equal potential. Therefore, a voltage approximately equal to the voltage applied to the segment electrode X appears at the island electrode 23.

First, the common electrode $Y_1$ in the 1st row is selected by the common electrode drive circuit 2 to receive a specified voltage. In the above condition, a voltage corresponding to image data is applied to the segment electrode $X_a$ by the segment electrode drive circuit 3 based on a display signal from the aforementioned display control circuit 6 (refer to FIG. 1). Consequently, an approximately equal voltage is applied to the island electrode $23_a$, while a voltage approximately equal to the voltage across the segment electrode $X_a$ and the common electrode $Y_1$ (the voltage referred to as the "display voltage" hereinafter) is applied to the liquid crystals 21 in the area of the island electrode $23_a$.

Therefore, when the above-mentioned display voltage is not lower than "Vth1" and lower than "Vth2" as shown in FIG. 3, the liquid crystals 21 in the relevant pixel area are put into the focalconic state and dark data are written into the liquid crystals. In contrast to the above, when the display voltage is not lower than "Vth2", the liquid crystals 21 in the relevant pixel area are put into the homeotropic orientation and light data are written into the liquid crystals.

Then a voltage corresponding to image data is applied to the segment electrode $X_b$ by the segment electrode drive circuit 3. Consequently, a voltage approximately equal to the display voltage is applied to the liquid crystals 21 in the area of the relevant island electrode $23_b$, and light data or dark data are written into the relevant liquid crystals 21 according to the display voltage.

By repeating the above-mentioned operation, voltages corresponding to the image data are successively written into the segment electrodes $X_1, X_2, \ldots X_m$ under the control of the segment electrode drive circuit 3, with which the image is written into the pixels in the 1st row and m columns of the aforementioned pixel matrix.

Then, the common electrode $Y_2$ in the 2nd row is selected by the common electrode drive circuit 2 to receive a specified voltage. In the above condition, voltages corresponding to the image data are successively applied to all the segment electrodes $X_1, X_2, \ldots X_m$ by the segment electrode drive circuit 3, with which the image is written into the pixels in the 2nd row and m columns.

Subsequently, the above-mentioned operation is repeated to write the image into the matrix of pixels in n rows and m columns to display the image.

The above are the principle of operations in each of the image input mode, pen input mode, image read mode, and image display mode of the image input device-integrated display unit 1 employing phase transition type liquid crystals as the liquid crystals 21.

In the present embodiment as described above, phase transition type liquid crystals are interposed between the common electrode Y formed via the light-shielding film 25 on the glass plate 28 and the island electrode 23 of each pixel electrically connected via the photoconductor 22 to the segment electrode X formed on the glass plate 29 to constitute the image input device-integrated display unit 1.

In the image input mode, the phase transition type liquid crystals in all the pixels of the pixel matrix composed of the areas of intersections between a plurality of segment electrodes X and a plurality of common electrodes Y are put into the Grandjean state under the control of the display control circuit 6, image input control circuit 8, and back light control circuit 12. Subsequently, reflection light from the white area of the document 31 is made to strike on the photoconductor 22 to make the photoconductor 22 have a low resistance to thereby put the phase transition type liquid crystals of the pixels on which the reflection light strikes into the focalconic state.

Thus the optical image of the document is copied into the pixel matrix.

In the pen input mode, the phase transition type liquid crystals in all the pixels of the pixel matrix are put into the Grandjean state under the control of the display control circuit 6, image input control circuit 8, and back light control circuit 12. Subsequently, reflection light of the light from the light source 41 of the input pen 10 is made to strike on the photoconductor 22 to make the photoconductor 22 have a low resistance to thereby put the phase transition type liquid crystals of the pixels at which the pen input took place into the focalconic state.

Thus the image is written into the above-mentioned pixel matrix by means of the input pen 10.

In the image read mode, the control light from the back light 11 is made to strike on the photoconductor 22 to make the photoconductor 22 have a low resistance to thereby scan the island electrodes 23 successively with a voltage such that it does not change the state of the phase transition type liquid crystals under the control of the image data detection control circuit 7 and the back light control circuit 12. In the above time, each common electrode Y is successively selected by the common electrode selection circuit 4 to detect the time series of the voltage induced at the common electrode Y by means of the image data detection circuit 9.

Thus the image data of each pixel constituting the aforementioned pixel matrix (i.e., the alignment state of the phase transition type liquid crystals) are taken out as an electric signal corresponding to the alignment state of the phase transition type liquid crystals pertinent to the pixel.

In the image display mode, voltages corresponding to the image data are applied to all the segment electrodes $X_1$ through $X_m$ while successively selecting each common electrode Y under the control of the display control circuit 6 and the back light control circuit 12. In the above time, the control light from the back light 11 is made to strike on the photoconductor 22 to make the photoconductor 22 have a low resistance to thereby apply a voltage corresponding to the image data to the phase transition type liquid crystals of the relevant pixels constituting the pixel matrix, with which the alignment state of the phase transition type liquid crystals of the relevant pixels is put into an alignment state corresponding to the image data.

Thus an image corresponding to the image data is written into the above-mentioned pixel matrix to display the image.

Therefore, according to the image input device-integrated type display device employing the image input device-integrated display unit 1 of the present embodiment, the image display function, document optical image copying function, display image read function, and the pen input function can be provided by one device.

Second embodiment

Then the following describes the operation of the image input device-integrated display unit 1 employing a current/electric field effect type liquid crystals as the liquid crystals 21 in regard to each mode. The liquid crystals of the above type are n-type cholesteric liquid crystals, liquid crystals formed by mixing the n-type cholesteric liquid crystals with n-type nematic liquid crystals, or smectic-A liquid crystals.

It is noted that the image input device-integrated display unit of the present embodiment has utterly the same construction as that of the image input device-integrated display unit 1 as shown in FIG. 2 except for the liquid crystals. Therefore, the following description is made with reference to FIG. 2.

Before explaining the operation, reference is first made to a change of the alignment state of the liquid crystals.

FIGS. 9(a) through 9(d) schematically show a change of the state of the current/electric field effect type liquid crystals.

Referring to FIG. 9(a), in the initial state, the helical axes of the cholesteric liquid crystal molecules are in the Grandjean state where the helical axes are aligned in a direction perpendicular to the electrode surfaces, when the current/electric field effect type liquid crystals (referred to merely as the "liquid crystals" in the present embodiment) are transparent.

Then referring to FIG. 9(b), when a DC voltage or a low-frequency AC voltage is applied to the liquid crystals and the voltage is gradually increased, the negative ions incorporated into the liquid crystals move at a voltage which is not lower than a threshold voltage. With the above-mentioned operation, the helical axes aligned in a direction are disordered to be directed in irregular directions to be in the focalconic state. In the focalconic state, the liquid crystals are optically opaque.

The focalconic state is stored even when the electric field is removed as shown in FIG. 9(c).

In order to erase the alignment state of the liquid crystals thus stored, a voltage having a high frequency (several kilohertz) at which no current effect is generated is applied to the liquid crystals as shown in FIG. 9(d). With the above-mentioned operation, the liquid crystal molecules directed in irregular directions are aligned in a direction to be restored into the Grandjean state.

The above-mentioned liquid crystal molecules have an anisotropy of dielectric constant, and therefore the dielectric constant of the entire liquid crystal cell changes depending on the alignment state of the liquid crystal molecules.

(1) Image input mode

In a first step, the liquid crystals 21 are entirely put into the transparent state (i.e., the aforementioned Grandjean state).

Control light is irradiated by the back light 11 from the side of the glass plate 29, and a voltage having a high frequency (several kilohertz) at which no current effect is generated is applied across the segment electrode X and the common electrode Y under the control of the display control circuit 6. In the above time, the voltage may be applied either successively or simultaneously. Consequently, the liquid crystals 21 are put into the Grandjean state to be entirely transparent, i.e., put into the initial state before the write operation.

In a second step, the reflection light from the document is copied into the liquid crystals 21.

The above-mentioned document is placed under the glass plate 29 with the document closely fit to the glass plate 29. Under the control of the image input control circuit 8, a DC voltage or a low-frequency AC voltage which is not lower than the threshold voltage at which the liquid crystals 21 are transformed into the focalconic state by the current effect is applied successively or simultaneously across each segment electrode X and each common electrode Y. Then by irradiating document illumination light by means of the back light 11 from the side of the glass plate 28, the light transmitted through the image input device-integrated display unit 1 is converged on the surface of the document by the micro lens 27.

In the case where the convergence light strikes on a white area of the document, the reflection light strikes on the photoconductor 22 to make the photoconductor 22 have a low resistance. Then a voltage approximately equal to the DC voltage or the low-frequency AC voltage which is not lower than the aforementioned threshold voltage applied across the segment electrode X and the common electrode Y is applied across the island electrode 23 and the common electrode Y (i.e., to the liquid crystals 21), with which the liquid crystals 21 are transformed from the Grandjean state where the liquid crystals are transparent to the focalconic state where the liquid crystals are turbid whitely.

In other words, the white area of the document is invertedly written into the liquid crystals 21 as a black area.

In contrast to the above, in the case where the convergence light strikes on a black area of the document, no reflection light strikes on the photoconductor 22 to allow the photoconductor 22 to remain having a high resistance. In the above time, by setting the dark resistance of the photoconductor 22 at a value such that it becomes higher than the resistance of the liquid crystals 21, a great voltage drop due to the photoconductor 22 results to apply almost no voltage across the island electrode 23 and the common electrode Y. Therefore, the liquid crystals 21 maintain the initial Grandjean state to be transparent.

In other words, the black area of the document is invertedly written into the liquid crystals 21 as a white area.

Thus the negative image of the document is written into the matrix of n x m pixels of the image input device-integrated display unit 1.

(2) Pen input mode

The liquid crystals 21 are put into the initial state in the same manner as in the aforementioned image input mode. Subsequently, under the control of the image input control circuit 8, a DC voltage or a low-frequency AC voltage which is not lower than the threshold voltage at which the liquid crystals 21 are transformed into the focalconic state is applied successively or simultaneously across each segment electrode X and each common electrode Y. It is noted that the principle of the pen input operation is the same as the principle of operation in the aforementioned image input mode.

When the pen touch switch 45 of the input pen 10 having a structure as shown in FIG. 6 is turned on, light is emitted from the light source 41. Then the light from the light source 41 is transmitted through the image input device-integrated display unit 1 and reflected on the white sheet placed under the glass plate 29 to be incident on the photoconductor 22.

Consequently, the resistance of the photoconductor 22 is reduced to make the electric potential at the island electrode 23 be approximately equal to the electric potential at the segment electrode X, and the DC voltage or the low-frequency AC voltage which is not lower than the aforementioned threshold voltage is applied to the liquid crystals 21 constituting the relevant pixel. Thus the liquid crystals 21 are transformed into the focalconic state (where the liquid crystals are turbid whitely).

Subsequently, when the input pen 10 is moved out of the relevant pixel area or the input pen 10 is put apart from the image input device-integrated display unit 1 to turn off the pen touch switch 45, no light is incident on the relevant pixel to make the resistance of the photoconductor 22 be the dark resistance. Consequently, a great voltage drop takes place at the photoconductor 22, with which the voltage applied to the liquid crystals 21 is made to be "0".

Thus the liquid crystals 21 in the relevant pixel area which are put into the focalconic state by the pen input maintains the focalconic state. In other words, dark data are written into the liquid crystals 21 in the relevant pixel area by the pen input.

By time-sharingly processing the above-mentioned pen input mode and the image read mode as described hereinafter, the coordinates of the pixel currently designated by the input pen 10 can be detected.

In order to erase the image data already written, a voltage which has a high frequency (several kilohertz) not lower than the aforementioned threshold value is required to be applied across the segment electrode X and the common electrode Y to put the liquid crystals 21 of the pixels traced by the input pen into the Grandjean state.

(3) Image read mode

Control light is irradiated by the back light 11 from the side of the glass plate 29 of the image input device-integrated display unit 1. Then the incident light strikes on the photoconductor 22 to make the photoconductor 22 have a low resistance.

In the above condition, pulses of a DC voltage or a low-frequency AC voltage not higher than the aforementioned threshold voltage is successively applied to each of the segment electrodes $X_1, X_2, \ldots X_m$ by means of the segment electrode drive circuit 3 under the control of the aforementioned image data detection control circuit 7. In the above time, since the photoconductor 22 has a low resistance, the island electrode 23 is scanned by a pulse having a voltage approximately equal to the voltage applied to the segment electrode X. In the above case, the above-mentioned DC voltage or the low-frequency AC voltage not higher than the aforementioned threshold value is applied to the liquid crystals 21, and therefore the alignment state of the liquid crystals 21 does not change.

Consequently, a voltage is induced at the common electrode Y due to the pulse voltage applied to the island electrode 23 which is electrostatically coupled with the aforementioned common electrode Y. In the above case, the magnitude of the induction voltage corresponds to the electrostatic capacitance generated across the island electrode 23 and the common electrode Y. Since the distance between the island electrode 23 and the common electrode Y is constant, the electrostatic capacitance across the island electrode 23 and the common electrode Y varies according to the dielectric constant of the liquid crystals 21.

The dielectric constant of the liquid crystals 21 varies according to the alignment state of the liquid crystal molecules. The alignment state of the liquid crystal molecules determines the brightness condition of the data to be written.

Therefore, by detecting the voltage induced by selecting one common electrode Y while the segment electrodes $X_1$ through $X_m$ are scanned once, the alignment state of the liquid crystals 21 of the pixels in the 1st row and m columns provided in the position of the common electrode Y (i.e., the brightness condition of the pixel) can be detected in time series.

Thus by scanning the segment electrodes $X_1$ through $X_m$ by means of the segment electrode drive circuit 3 every time selecting successively each of the common electrode $Y_1$ through $Y_n$ by means of the common electrode selection circuit 4, image data of the matrix of the pixels in n rows and m columns are read as an electric signal.

It is noted that the control light for making the photoconductor 22 have a low resistance is not always required to be irradiated in the above-mentioned image read mode.

(4) Image display mode

Illumination light is irradiated by the back light 11 from the side of the glass plate 29. Then the photoconductor 22 is made to have a low resistance to make the island electrode 23 have approximately equal electric potential as the electric potential at the segment electrode X.

In the above condition, each common electrodes Y is successively selected by the common electrode drive circuit 2 under the control of the display control circuit 6 to set the common electrode Y at a specified electric potential. Then all the segment electrodes $X_1$ through $X_m$ are successively scanned by the segment electrode drive circuit 3 while a specified common electrode is selected to apply the aforementioned DC voltage (or the low-frequency AC voltage) or a high-frequency (several kilohertz) not lower than the threshold value to each of the segment electrodes $X_1$ through $X_m$ according to the image data.

Consequently, the pixels relevant to the liquid crystals 21 to which the DC voltage (or the low-frequency AC voltage) not lower than the aforementioned threshold value is applied among the pixels constituting the aforementioned pixel matrix exhibit a dark display. Meanwhile, the pixels relevant to the liquid crystals 21 to which the high-frequency voltage is applied exhibit a light display. Thus an image corresponding to the aforementioned image data is displayed on the above-mentioned pixel matrix.

Third embodiment

Then the following describes the principle of operation of the image input device-integrated display unit 1 employing ferroelectric liquid crystals as the liquid crystals 21 in regard to each mode.

Figure 10:
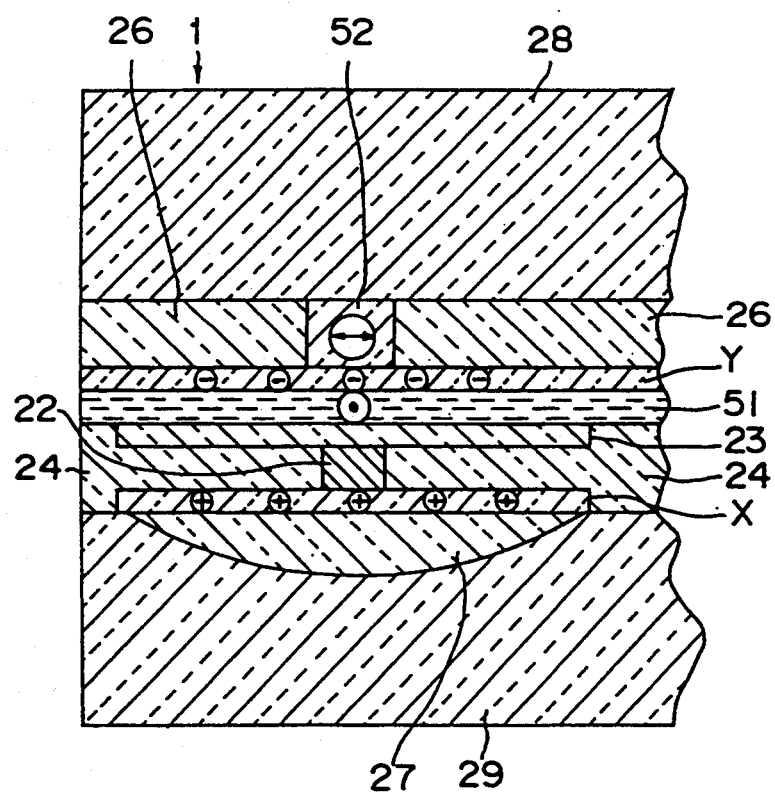
FIG. 10 is a sectional view of a part of an image input device-integrated type display device employing ferroelectric liquid crystals.

FIG. 10 is a sectional view showing the structure of an image input device-integrated type display unit 1 of the present embodiment taken along the common electrode Y, where the same components as those in FIG. 2 are denoted by the same numerals and no detailed description therefor is provided herein.

The above-mentioned ferroelectric liquid crystals are in either of only two stable states in the case where they are encapsulated in a cell having a thickness of several micrometers. The liquid crystals have the characteristic of storing either of the stable states in which they are.

In the above case, the above-mentioned two stable states include the state in which the ferroelectric liquid crystals are directed in one direction (assumed to be a direction A) and the state where the ferroelectric liquid crystals are directed in the other direction (assumed to be a direction B) in a plane in parallel with the aforementioned cell. When a polarization plate is placed with its polarization direction directed in a direction perpendicular to one (assumed to be the direction A) of the two directions, the ferroelectric liquid crystals of which molecules are directed in the direction (direction A) produce a transmission light having a low intensity. The ferroelectric liquid crystals of which molecules are directed in the other direction (direction B) produce a transmission light having a high intensity. It is noted that the two directions (direction A and direction B) are not always perpendicular to each other in the above case.

A transition between the above-mentioned two stable states can be effected only by changing the polarity of the voltage to be applied to the liquid crystals.

Referring to FIG. 10, there are included ferroelectric liquid crystals 51, a photoconductor 22, an island electrode 23, a segment electrode X, and a common electrode Y. It is noted that the segment electrode X, the common electrode Y, and the island electrode 23 are transparent electrodes made of ITO (indium tin oxide).

A polarizer 52 is formed on the common electrode Y on the photoconductor 22. The polarization direction of the polarizer 52 is in the same direction as that of the common electrode Y in the plane of the paper on which FIG. 10 is illustrated, the polarization direction indicated by an arrow "⟵⟶" as shown in FIG. 10.

The ferroelectric liquid crystals 51 exhibit two stable molecule alignments in a plane which is perpendicular to the plane of the paper and in parallel with the polarization direction of the polarizer 52. One of the alignments is a molecular alignment in a direction perpendicular to the polarization direction of the polarizer 52, the molecular alignment indicated by "·" as shown in FIG. 10. The other is the molecular alignment in a direction approximately in parallel with the polarizing element of the polarizer 52, the molecular alignment indicated by "⟵⟶".

Therefore, when the polarization direction of the polarizer 52 and the molecular alignment direction of the ferroelectric liquid crystals 51 are the combination of "⟵⟶" and "·" the polarization direction of the polarizer 52 and the alignment direction of the ferroelectric liquid crystals 51 are perpendicular to each other, and therefore a laminate of the polarizer 52 and the ferroelectric liquid crystals 51 allows less light to be transmitted therethrough. In contrast to the above, when the above-mentioned combination is of "⟵⟶" and "⟵⟶", the polarization direction of the polarizer 52 and the alignment direction of the ferroelectric liquid crystals 51 are approximately in parallel with each other, and therefore the laminate of the polarizer 52 and the ferroelectric liquid crystals 51 allows more light to be transmitted therethrough.

The two alignment directions of "⟵⟶" and "·" of the ferroelectric liquid crystals 51 can be controlled by inverting the polarity of the voltage applied across the common electrode Y and the island electrode 23. It is assumed in the present embodiment that the alignment direction of the ferroelectric liquid crystals 51 is "·" when the common electrode Y is in the negative polarity and the island electrode 23 is in the positive polarity, and conversely the alignment direction of the ferroelectric liquid crystals 51 is "⟵⟶" when the common electrode Y is in the positive polarity and the island electrode 23 is in the negative polarity.

(1) Image input mode

FIGS. 11(a) through 11(d) show the operation of the image input device-integrated display unit 1 in the image input mode.

Figure 11A:
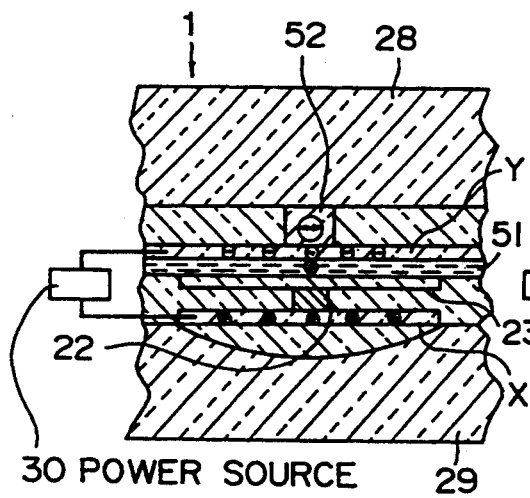
FIGS. 11(a), 11(b), 11(c) and 11(d) are diagrams for explaining an operation in an image display mode of an image input device-integrated type display device employing ferroelectric liquid crystals.

In a first step, the alignment direction of the entire ferroelectric liquid crystals 51 is put in the state of "·" as shown in FIG. 11(a).

Control light is irradiated on the entire surface of the liquid crystals by the back light 11 from the side of the glass plate 29 to apply a negative voltage to the common electrode Y and a positive voltage to the segment electrode X from the power source 30 under the control of the display control circuit 6. In the above case, the voltages may be applied either successively or simultaneously. Consequently, the photoconductor 22 on which the control light strikes is made to have a low resistance, with which the island electrode 23 and the segment electrode X are made to have an equal voltage, while the alignment direction of the ferroelectric liquid crystals 51 is made to be entirely "·", i.e., in the initial state before the write operation.

In a second step, reflection light from a document is copied into the ferroelectric liquid crystals 51.

Figure 11B:
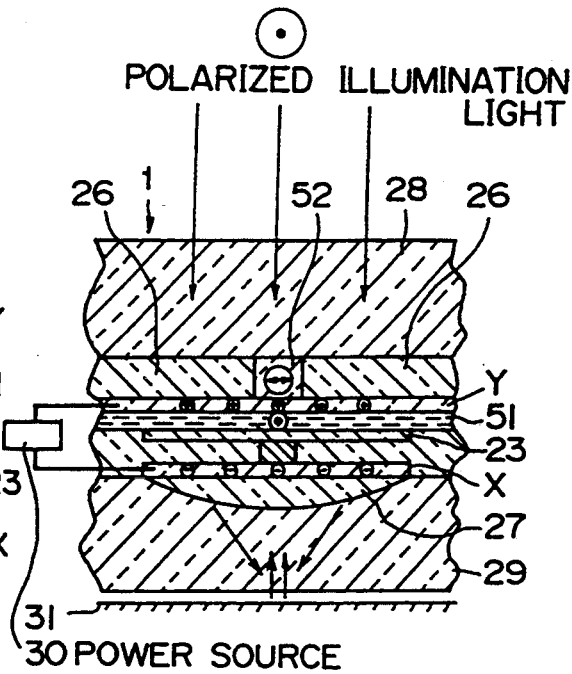

In a manner as shown in FIG. 11(b), the document 31 is placed under the glass plate 29 with the document closely fit to the glass plate 29. Under the control of the image input control circuit 8, a positive voltage is applied to the common electrode Y and a negative voltage is applied to the segment electrode X from the power source 30. In the above case, the voltages may be applied either successively or simultaneously. Then polarized illumination light having a polarization direction of "·" is irradiated on the entire surface of the liquid crystals from the side of the glass plate 28.

Consequently, the polarization direction of the polarized illumination light is perpendicular to the polarization direction of the polarizer 52, and therefore the polarized illumination light does not enter into a portion directly below the polarizer 52. In other words, the polarized illumination light from above does not reach the polarizer 52. Meanwhile, the alignment direction of the ferroelectric liquid crystals 51 is the same as the polarization direction of the polarized illumination light. Therefore, the polarized illumination light which enters from the area of the transparent insulator 26 except for the polarizer 52 and is transmitted through the common electrode Y to reach the ferroelectric liquid crystals 51 is transmitted through the ferroelectric liquid crystals 51. The polarized illumination light is further transmitted through the island electrode 23 and the segment electrode X to be converged on the surface of the document by the micro lens 27.

Figure 11C:
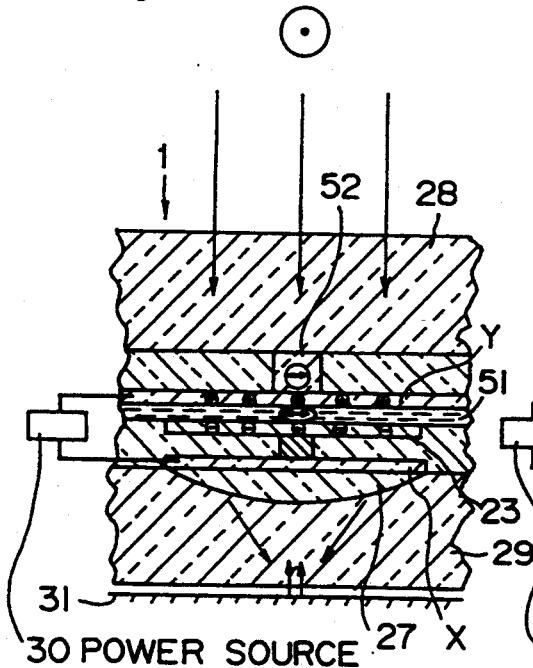

In the case where the convergence light strikes on a white area of the document 31, reflection light strikes on the photoconductor 22 to make the photoconductor 22 have a low resistance. Then the electric potential at the island electrode 23 is made to be approximately equal to the electric potential at the segment electrode X to apply the positive voltage to the common electrode Y and the negative voltage to the island electrode 23. Consequently, the alignment direction of the ferroelectric liquid crystals 51 changes from the state of "·" to the state of "←→" as shown in FIG. 11(c).

In other words, the white area of the document 31 is written into the ferroelectric liquid crystals 51 as the alignment state of "←→".

Figure 11D:
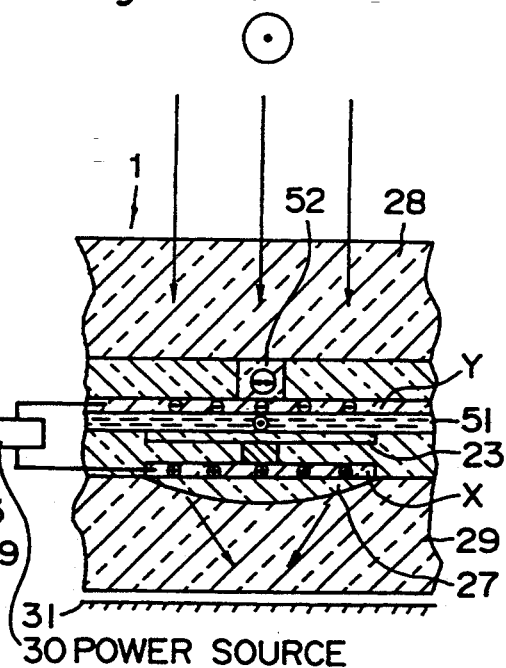

In contrast to the above, in the case where the convergence light strikes on a black area of the document 31, no reflected light strikes on the photoconductor 22 as shown in FIG. 11(d), and therefore the photoconductor 22 remains having a high resistance (dark resistance). In the above case, by making the dark resistance of the photoconductor 22 have a resistance higher than the resistance of the ferroelectric liquid crystals 51, a great voltage drop due to the photoconductor 22 results to apply almost no voltage across the island electrode 23 and the common electrode Y. Therefore, the alignment direction of the ferroelectric liquid crystals 51 is maintained in the state of "·".

In other words, the black area of the document 31 is written into the ferroelectric liquid crystals 51 as the alignment state of "·".

Thus the optical image of the document 31 where the two alignment directions of the ferroelectric liquid crystals 51 exist mixedly is written into the matrix of n×m pixels of the image input device-integrated display unit 1 and then temporarily stored. Therefore, in viewing the image copied into the above-mentioned pixel matrix, a positive image display results when the polarization direction of the display illumination light irradiated from the side of the glass plate 29 is "←→", while a negative image display results when the polarization direction is "·".

(2) Pen input mode

FIGS. 12(a) through 12(c) show the operation of the image input device-integrated display unit 1 in the pen input mode.

In a first step, the alignment direction of the entire ferroelectric liquid crystals 51 is put in the state of "←→" as shown in FIG. 12 (a).

Control light is irradiated on the entire surface of the liquid crystals by the back light 11 from the side of the glass plate 29 to apply a positive voltage to the common electrode Y and a negative voltage to the segment electrode X from the power source 30 under the control of the display control circuit 6. In the above case, the voltages may be applied either successively or simultaneously. Consequently, the photoconductor 22 on which the control light strikes is made to have a low resistance, with which the island electrode 23 and the segment electrode X are made to have an equal voltage, while the alignment direction of the ferroelectric liquid crystals 51 is made to be entirely "←→", i.e., in the initial state before the write operation.

In a second step, an image is written on the pixel matrix by means of the input pen 10.

Under the control of the image input control circuit 8, a negative voltage is applied to the common electrode Y and a positive voltage is applied to the segment electrode X from the power source 30 as shown in FIG. 12(b). In the above case, the voltages may be applied either successively or simultaneously.

In the above condition, the tip of the input pen 10 having a structure as shown in FIG. 6 is pressed against a pen input position on the image input device-integrated display unit 1. Then the pen touch switch 45 is turned on to emit light from the light source 41. The light from the light source 41 is circularly polarized light, and therefore the light is transmitted through the polarizer 52 to directly strike on the photoconductor 22. Consequently, the photoconductor 22 is made to have a low resistance to make the island electrode 23 and the segment electrode X have an equal electric potential, with which the alignment direction of the ferroelectric liquid crystals 51 is transformed from the initial state of "←→" to the state of "·".

Subsequently, when the input pen is moved out of the relevant pixel area or the input pen is put apart from the image input device-integrated display unit 1 to turn off the pen touch switch 45, no light is incident on the relevant pixel to make the resistance of the photoconductor 22 be the dark resistance. Consequently, a great voltage drop takes place at the photoconductor 22, with which the voltage applied to the ferroelectric liquid crystals 51 is made to substantially be "0".

Thus the ferroelectric liquid crystals 51 of which alignment direction is "·" by the pen input maintains their alignment state. In other words, image data are written and stored into the ferroelectric liquid crystals 51 in the relevant pixel area by the pen input. It is noted that the island electrode 23 is charged with positive electric charges in the above case as shown in FIG. 12(c).

In contrast to the above, the ferroelectric liquid crystals 51 in the pixel area where no pen input took place maintain the initial state of "←→", while the island electrode 23 is not charged with electric charges.

By time-sharingly processing the above-mentioned pen input mode and the image read mode as described hereinafter, the coordinates of the pixel at which the input pen 10 is designating can be detected.

In order to erase the image already written, a negative voltage is applied to the segment electrode X and a positive voltage is applied to the common electrode Y to change the alignment direction of the ferroelectric liquid crystals 51 in the pixel area which was traced by the input pen into the state of "←→".

In the pen input mode of the aforementioned first and second embodiments, an image is written into the liquid crystals by means of reflection light from the input pen 10, and therefore a white sheet is necessary as a reflective object. However, in the pen input mode of the present embodiment, an image is directly written into the ferroelectric liquid crystals 51 by means of light from the input pen 10, and therefore no white sheet is necessary as a reflective object.

(3) Document image read mode

The document image read mode is the mode for reading brightness data of a document as an electric signal. FIGS. 13(a) through 13(c) show the operation of the image input device-integrated display unit 1 in the document image read mode.

In a first step, the alignment direction of the entire ferroelectric liquid crystals 51 is put into the initial state of "←→" as shown in FIG. 13(a).

Control light is irradiated on the entire surface of the liquid crystals by the back light 11 from the side of the glass plate 29. Under the control of the display control circuit 6, a positive voltage is applied to the common electrode Y and a negative voltage is applied to the segment electrode X from the power source 30. Consequently, the island electrode 23 and the segment electrode X are made to have an equal voltage, with which the alignment direction of the entire ferroelectric liquid crystals 51 is put into the state of "←→". Subsequently when irradiation of the control light is stopped, the island electrode 23 is charged with negative electric charges. The above-mentioned state is the initial state.

In a second step, reflection light from the document is copied into the ferroelectric liquid crystals 51.

In a manner as shown in FIG. 13 (b), polarized illumination light having a polarization direction of "·" perpendicular to the polarization direction of "←→" of the polarizer 52 is irradiated from the side of the glass plate 28. Meanwhile, a document 31 is placed under the glass plate 29 with the document closely fit to the glass plate 29. Under the control of the image input control circuit 8, a positive voltage is applied to the segment electrode X and a negative voltage is applied to the common electrode Y from the power source 30. It is noted that the voltage applied to the ferroelectric liquid crystals 51 is a voltage which is lower than such a threshold voltage that it does not change the alignment direction.

Since the polarization direction of "←→" of the polarizer 52 and the polarization direction of "·" of the polarized illumination light are perpendicular to each other, the photoconductor 22 is not directly illuminated the polarized illumination light. Besides, the two possible alignment directions of the ferroelectric liquid crystals 51 are not perfectly perpendicular to each other for the reason as described above. Therefore, the polarization direction of the polarized illumination light and the alignment direction of the ferroelectric liquid crystals 51 are not perfectly perpendicular to each other, which results in a small quantity of light transmitted from the ferroelectric liquid crystals 51. The transmission light is used to illuminate the document 31.

When there is reflection light from the document 31, the resistance of the photoconductor 22 is reduced. In the above case, a positive voltage which is not higher than the threshold value is applied to the segment electrode X. Therefore, the negative electric charges charged at the island electrode 23 leak by way of the photoconductor 22. Consequently, the quantity of negative charges at the island electrode 23 is reduced. When there is no reflection light from the document 31, the resistance of the photoconductor 22 keeps the dark resistance. Therefore, the island electrode 23 is still charged with the negative electric charges built up in the initial state.

Thus the monochrome data of the aforementioned document 31 are copied as data of electric charges at the island electrode 23.

In either of the above-mentioned cases, the alignment direction of the ferroelectric liquid crystals 51 does not change.

In a third step, the image data copied into the island electrode 23 are converted into an electric signal.

In a manner as shown in FIG. 13(c), control light having a polarization direction of "←→" in parallel with the polarization direction of "←→" of the aforementioned polarizer 52 is irradiated from the side of the glass plate 28. Under the control of the image data detection control circuit 7, a negative voltage is applied to each segment electrode X and a positive voltage is applied to each common electrode Y from the power source 30.

Then a load resistor is inserted in a portion of the electric circuit composed of the aforementioned power source 30, common electrode Y, and segment electrode X.

In the pixel where the quantity of electric charges at the island electrode 23 is reduced by the reflection light from the document 31 in the above-mentioned second step, negative charges are supplemented to the island electrode 23 from the segment electrode X to which the negative voltage is applied. In the above case, a current flows through the aforementioned electric circuit, and therefore an electric potential difference takes place across the terminals of the load resistor.

In contrast to the above, in the pixel where the quantity of the electric charges at the island electrode 23 is not reduced because of no reflection light from the document 31, the negative charges are not supplemented to the island electrode 23 from the segment electrode X, and therefore no electric potential difference takes place across the terminals of the load resistor.

In a third step, the above-mentioned load resistor is practically connected to the segment electrode X, and the aforementioned control light having the polarization direction of "←→" is irradiated on each common electrode Y one by one. Then the control light is irradiated successively onto the common electrode $Y_1$ through the common electrode $Y_n$ to scan the common electrode Y. By successively detecting the electric potential differences across the terminals of the load resistor connected to each of the segment electrodes $X_1$ through $X_m$ when the control light is irradiated on a certain common electrode Y, the charge conditions of the island electrode 23 in (m) pixels provided at the position of the common electrode Y (i.e., the presence or absence of reflection light from the document 31, which is equal to the brightness condition of the document 31) can be read as a time series of an electric signal.

Figure 14A:
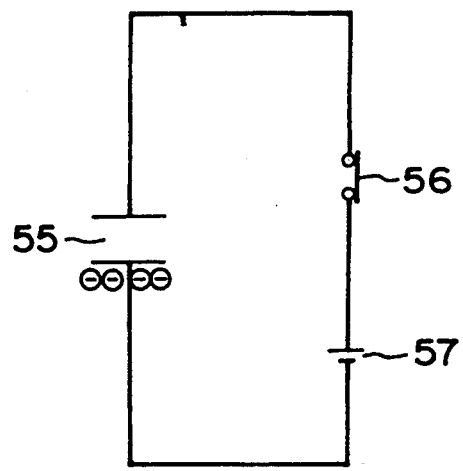
FIGS. 14(a), 14(b) and 14(c) are diagrams for explaining an operation in a document image read mode of an image input device-integrated type display device employing ferroelectric liquid crystals.
Figure 14B:
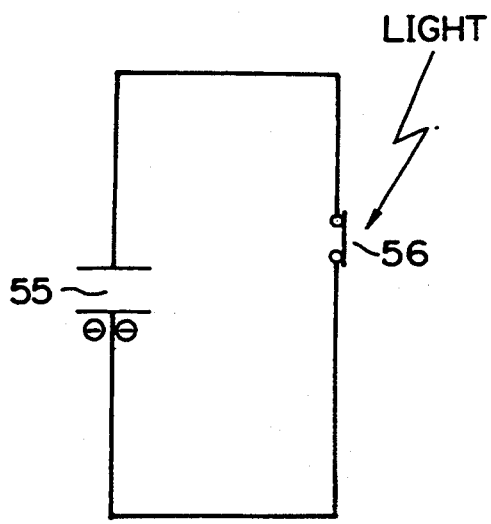

FIG. 14 shows the concept of the operation of the image input device-integrated display unit 1 in the document image read mode. The electric circuit composed of the aforementioned power source 30, common electrode Y, and segment electrode X can be expressed by an equivalent circuit as shown in FIG. 14(a).

In more detail, a capacitor 55 is the electrostatic capacitance across the above-mentioned common electrode Y and the island electrode 23. A switch 56 is the photoconductor 22 which is made to have a low resistance (i.e., "on" condition) when it receives light to make the electric potential at the island electrode 23 equal to the electric potential at the segment electrode X. A power source 57 is the aforementioned power source 30.

First, control light is temporarily irradiated on the above-mentioned switch 56 to turn on the switch 56 and thereby charge the capacitor 55 with electric charges (aforementioned first step).

Then, as shown in FIG. 14 (b), the electric charges in the capacitor 55 is made to leak by removing the power source 57 (making the voltage applied to the ferroelectric liquid crystals 51 from the power source 30 be not higher than the threshold voltage) and thereby turning on the switch 56. In the above case, turning-on and turning-off operations of the switch 56 are controlled by the reflection light from the document 31 (aforementioned second step).

Figure 14C:
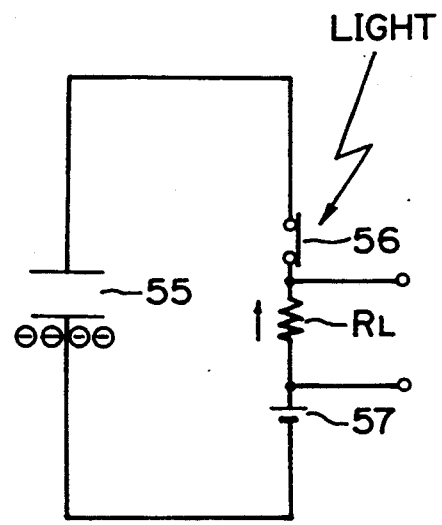

Then, as shown in FIG. 14(c), the aforementioned power source 57 is inserted again and a load resistor $R_L$ is inserted in between the switch 56 and the power source 57. The switch 56 is turned on to supplement the electric charges leaked from the capacitor 55 by means of the power source 57. Then, in a capacitor 55 from which the electric charges have leaked, a current flows to supplement the leak electric charges to generate an electric potential difference across the terminals of the load resistor $R_L$. In contrast to the above, in a capacitor 55 from which no electric charges have leaked, no current flows to generate no electric potential difference across the terminals of the load resistor $R_L$ (aforementioned third step).

Therefore, by detecting the electric potential difference across the terminals of the above-mentioned load resistor $R_L$, the optical image of the document 31 can be read as an electric signal.

It is noted that the turning-on and turning-off of the switch 56 is controlled by the control light irradiated on each common electrode Y one by one.

(4) Image read mode

The operation of the image input device-integrated display unit 1 in the image read mode is basically the same as in the aforementioned document image read mode.

Figure 15A:
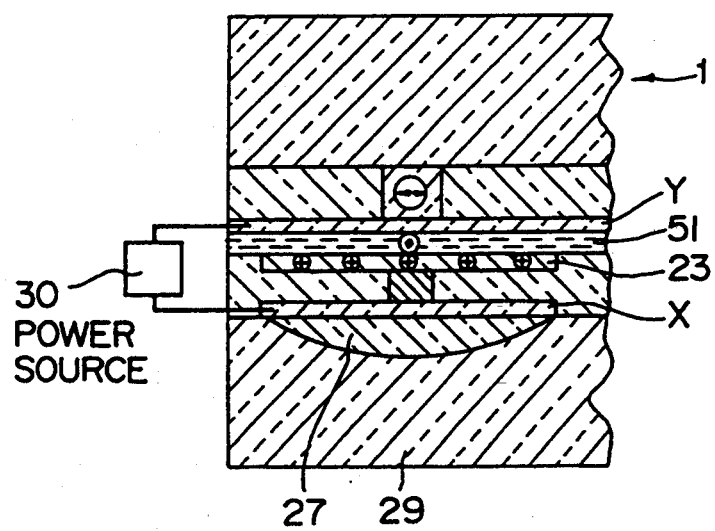
FIGS. 15(a) and 15(b) are diagrams for explaining an operation in an image read mode of an image input device-integrated type display device employing ferroelectric liquid crystals.

FIG. 15(a) shows the condition of the image input device-integrated display unit 1 relevant to the pixel immediately after image data are written into the matrix of n×m pixels by the input pen in the aforementioned pen input mode. The condition shown in FIG. 15(a) is the same as the condition shown in FIG. 12(c), where the island electrode 23 is charged with positive electric charges.

Figure 15B:
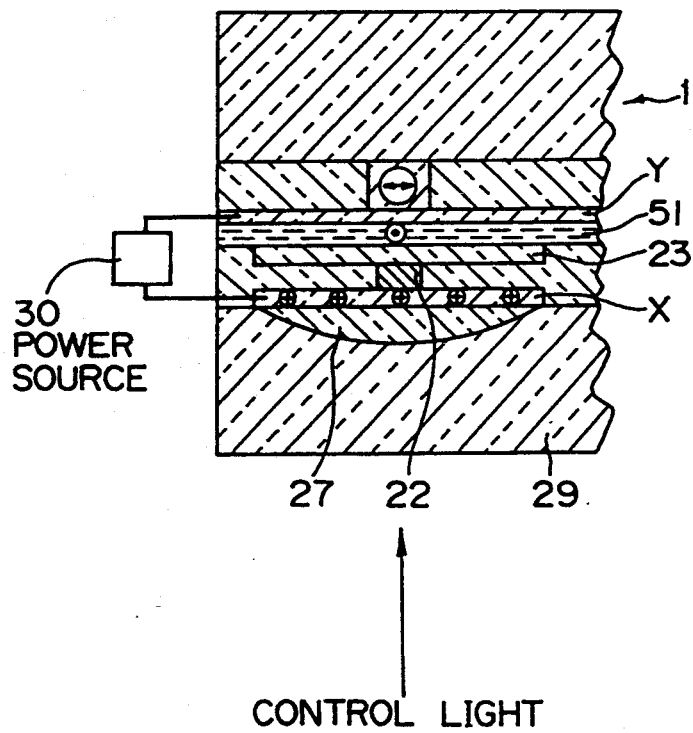

Then, as shown in FIG. 15(b), a linear control light is irradiated on each common electrode Y one by one from the side of the glass plate 29 of the image input device-integrated display unit 1 to scan the common electrodes $Y_1$ through $Y_m$. Under the control of the image data detection control circuit 7, a negative voltage is applied to each segment electrode X and a positive voltage is applied to each common electrode Y from the power source 30. In the above case, each of the voltages applied to the ferroelectric liquid crystals 51 is a voltage which is not higher than the threshold value at which the alignment direction of the ferroelectric liquid crystals 51 is not changed.

Then a load resistor is inserted in a portion of the electric circuit composed of the aforementioned power source 30, common electrode Y, and segment electrode X.

As described above, the island electrode 23 relevant to the pixel at which the pen input took place is charged with positive electric charges. Therefore, control light is irradiated on the photoconductor 22 to make the island electrode 23 and the segment electrode X have an equal electric potential. Then a negative voltage is applied to the segment electrode X and a positive voltage is applied to the common electrode Y, with which a current flows through the aforementioned electric circuit to produce an electric potential difference across the terminals of the aforementioned load resistor.

In contrast to the above, the island electrode 23 relevant to the pixel at which no pen input took place is not charged with positive electric charges. Therefore, no current flows through the aforementioned electric circuit to produce no electric potential difference across the terminals of the aforementioned load resistor.

Thus by detecting the electric potential difference across the terminals of the aforementioned load resistor, the image data written into the pixel matrix of the image input device-integrated display unit 1 by the input pen 10 can be read as an electric signal.

(5) Image display mode

The image display mode is the mode in which image data are written into the pixel matrix of the image input device-integrated display unit 1 according to an electric signal. It is noted that the principle of image display operation by means of the image input device-integrated display unit 1 is the same as the principle of image display operation of the conventional simple matrix type liquid crystal display.

Figure 16A:
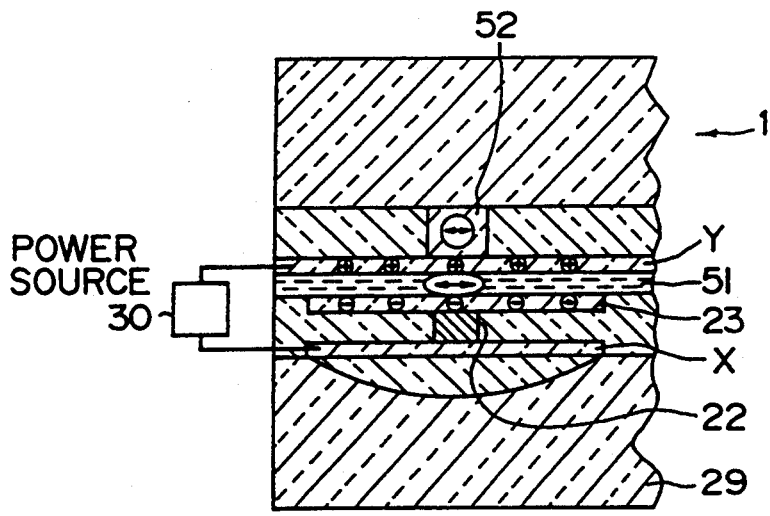
FIGS. 16(a) and 16(b) are diagrams for explaining an operation in an image display mode of an image input device-integrated type display device employing ferroelectric liquid crystals.

In a manner as shown in FIG. 16(a), control light having a polarization direction of "⟵⟶" is irradiated by the back light 11 from the side of the glass plate 29. Consequently, the photoconductor 22 on which the illumination light strikes is made to have a low resistance to make the island electrode 23 and the segment electrode X have an equal electric potential. In the above condition, a negative voltage is applied to each segment electrode X and a positive voltage is applied to each common electrode Y from the power source 30 under the control of the display control circuit 6. In the above time, a voltage which is not lower than a threshold value at which the alignment direction of the ferroelectric liquid crystals 51 is changed is applied to the ferroelectric liquid crystals 51. Consequently, the alignment direction of the ferroelectric liquid crystals 51 is made to be "⟵⟶".

In due course, the alignment direction of the ferroelectric liquid crystals 51 and the polarization direction of the illumination light are put in parallel with each other, with which the illumination light irradiated from the side of the glass plate 29 is transmitted through the image input device-integrated display unit 1. Then each common electrode Y is successively selected by the common electrode drive circuit 2 to apply a specified negative voltage from the power source 30. While a certain common electrode is selected, a positive voltage is applied to all the segment electrodes $X_l$ through $X_m$ by means of the segment electrode drive circuit 3. In the above time, a voltage which is not lower than the threshold value at which the alignment direction of the ferroelectric liquid crystals 51 is changed is applied to the segment electrode X relevant to the pixel at which an image is displayed according to image data. Meanwhile, a voltage which is lower than the above-mentioned threshold value is applied to the segment electrode X relevant to the pixel at which no image is displayed.

Figure 16B:
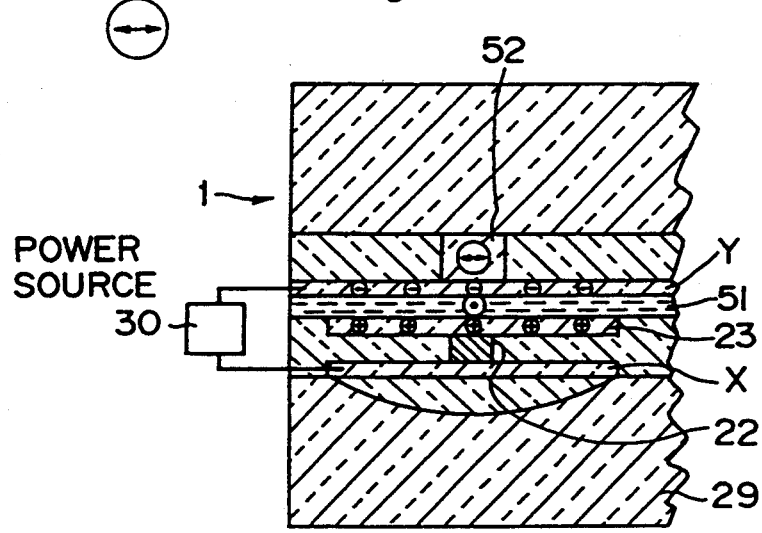

Consequently, as shown in FIG. 16(b), the alignment direction of the ferroelectric liquid crystals 51 relevant to the pixel at which an image is displayed among the pixels constituting the aforementioned pixel matrix becomes "·" to be perpendicular to the polarization direction of "⟵⟶" of the illumination light. Therefore, the pixel at which an image is displayed exhibits a dark display.

Meanwhile, the alignment direction of the ferroelectric liquid crystals 51 relevant to the pixel at which no image is displayed remains "⟵⟶" to be approximately in parallel with the polarization direction of "⟵⟶" of the illumination light. Therefore, the pixel at which no image is displayed exhibits a light display.

In the above case, by making the polarization direction of the illumination light equal to the polarization direction of the polarizer 52, the polarizer 52 is prevented from being displayed as a black dot.

It is noted that a negative image where the light portion and the dark portion are inverted can be displayed by making the polarization direction of the illumination light be "·" perpendicular to the polarization direction of the polarizer 52. The negative image can be also displayed by inverting the polarities of the voltages applied to the segment electrode X and the common electrode Y with the polarization direction of the illumination light kept intact.

As described above, a positive/negative inversion can be achieved through a simple process in the case of the ferroelectric liquid crystals 51.

Fourth embodiment

The micro lens 27 provided at the image input device-integrated display unit 1 in each of the aforementioned embodiments has a function of condensing the illumination light on the surface of the document and a function of preventing the cross-talk of the reflection light from the document in the image input mode. However, there is the drawback that the illumination light cannot be effectively used in the image display mode.

Figure 17:
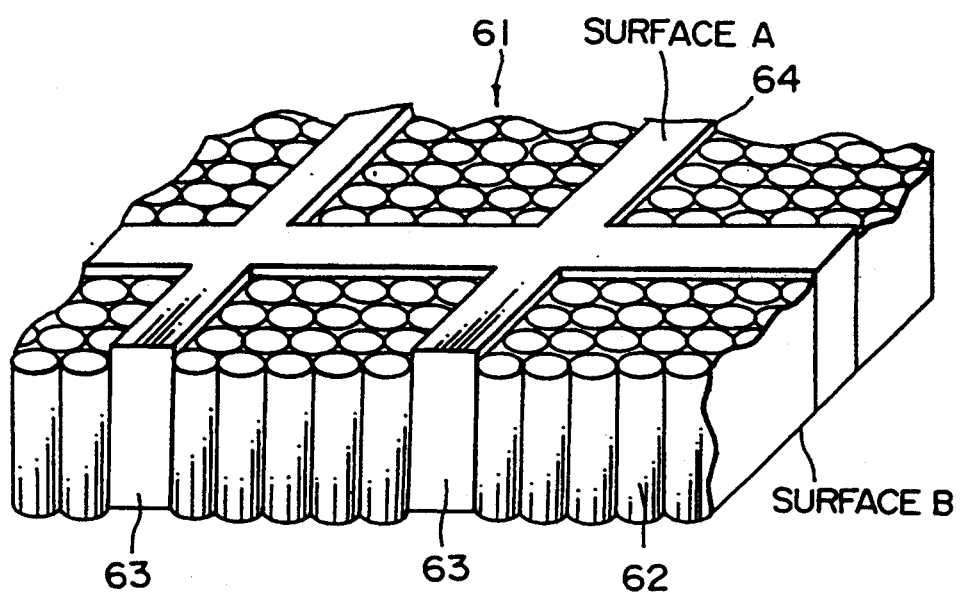
FIG. 17 shows a perspective view of a part of a plate-shaped optical fiber array.

In order to solve the above-mentioned drawback, a plate-shaped optical fiber array 61 as shown in FIG. 17 is used. It is noted that the plate-shaped optical fiber array 61 is used in place of the glass plate 29 of the aforementioned image input device-integrated display unit 1.

The above-mentioned plate-shaped optical fiber array 61 is substantially composed of cylindrical optical fibers 62 each having a certain length and a grating-shaped partition 63 for partitioning a plurality of optical fibers 62 two-dimensionally arranged in parallel with each other to hold the optical fibers 62 as formed in a plate shape where the lengthwise direction of the optical fibers extends in the thickness direction of the optical fiber array 61. Each area partitioned by the above-mentioned partition 63 is a pixel area.

The above-mentioned partition 63 is made of an opaque material in order to prevent the cross-talk between the pixels. In order to reduce the loss of light, the projection area of the partition 63 is made to be as small as possible.

As shown in FIG. 17, a difference-in-level 64 is provided between one end surface of the optical fibers 62 and an upper surface of the partition 63 at the upper in FIG. 17 (the upper surface referred to as the "surface A" hereinafter). On the other hand, the other end surface of the optical fibers 62 and a lower surface of the partition 63 are in an identical plane at the lower in FIG. 17 (the plane referred to as the "surface B" hereinafter).

The segment electrode X, the transparent insulator 24, and so forth are laminated on the surface B.

The plate-shaped optical fiber array 61 having the above-mentioned structure functions as follows in the image input mode.

In the image input mode, a document is placed on the surface A (practically the surface A of the plate-shaped optical fiber array 61 is placed on the document). In the above case, since the difference-in-level 64 is provided between the end surface of the optical fibers 62 and the upper surface of the partition 63, there is a gap between the end surface of the optical fibers 62 and the surface of the document. By taking advantage of the gap, illumination light is transmitted from the surface B to the surface A by way of the optical fibers 62 positioned at the periphery of each pixel, while reflection light from the document is transmitted from the surface A to the surface B by way of the optical fibers 62 positioned at the center of each pixel.

As described above, the above-mentioned plate-shaped optical fiber array 61 has an ability of condensing illumination light inferior to the same function of the micro lens 27 in the image input mode, however, it has a sufficient cross-talk preventing function. There is almost no loss of illumination light irradiated from the surface A in the image display mode.

Fifth embodiment

There are three types of lights composed of display illumination light, document illumination light, and control light as light irradiated onto the image input device-integrated display unit 1. It is very effective for compacting the image input device-integrated type display device that one light source can concurrently serve as the above-mentioned three light sources. In view of the above, the image input device-integrated type display device of the present embodiment is provided with a back light 11 which concurrently serves as the above-mentioned three light sources.

Figure 18A:
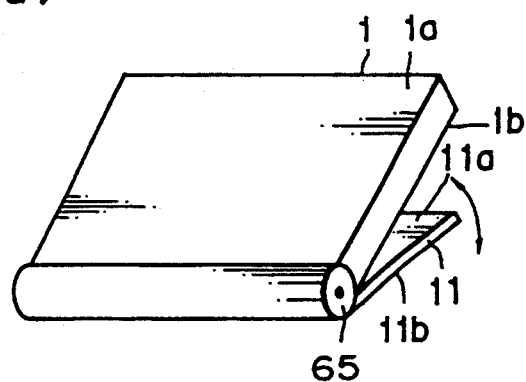
FIGS. 18(a), 18(b) and 18(c) are diagrams showing a relation in position between an image input device-integrated type display device of FIG. 1 and a back light.

One side portion of the image input device-integrated display unit 1 constituting the above-mentioned image input device-integrated type display device and one side portion of the back light 11 are connected together mutually pivotally around a pivot portion 65 as shown in FIG. 18(a). The back light 11 is designed to be able to irradiate light outwardly from its both surfaces 11a and 11b.

With the above-mentioned arrangement, by turning the back light 11 by approximately 360° in angle around the pivot portion 65, the back light 11 can irradiate light either on a display surface 1a (on the side of the glass plate 28) or a reflection surface 1b (on the side of the glass plate 29) of the image input device-integrated display unit 1.

Figure 18B:
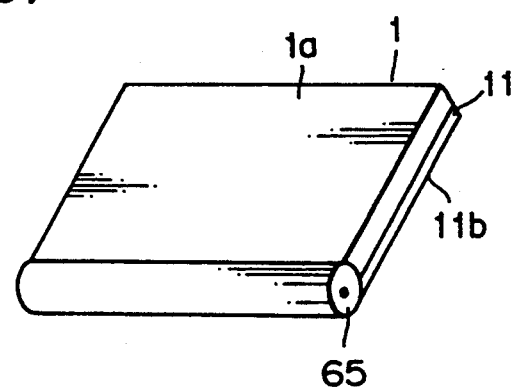

For instance, in the initial state of the aforementioned image input mode and the pen input mode, image read mode, or image display mode, the image input device-integrated display unit 1 and the back light 11 are in a relation in position as shown in FIG. 18(b). Then the illumination light from the surface 11a of the back light 11 is irradiated on the reflection surface 1b of the image input device-integrated display unit 1. In the above case, the light from the surface 11b of the back light 11 is not necessary, and therefore a reflection plate is arranged on the side of the surface 11b to make the light from the back light 11 be effectively irradiated on the image input device-integrated display unit 1.

Figure 18C:
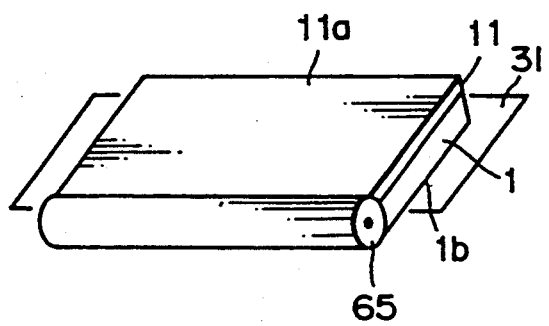

Then in the aforementioned image input mode or the document image read mode of the third embodiment employing ferroelectric liquid crystals, the back light 11 is turned by approximately 360° in angle around the pivot portion 65 from the position as shown in FIG. 18(b) to put the image input device-integrated display unit 1 and the back light 11 in a relation in position as shown in FIG. 18 (c). Meanwhile, a document 31 is placed under the reflection surface 1b of the image input device-integrated display unit 1. Thus the document illumination light from the surface 11b of the back light 11 is irradiated on the image display area 1a of the image input device-integrated display unit 1.

In the above case, the light from the surface 11a of the back light 11 is not necessary, and therefore a reflection plate is arranged on the side of the surface 11a.

By making one back light 11 concurrently serve as the three types of display illumination light source, document illumination light source, and control light source in a manner as described above, the image input device-integrated type display device can be entirely formed very compactly.

As is evident from the above description, the image input device-integrated type display device controls the image input control circuit, document illumination light source, and control light source by means of a control circuit in the image input mode to drive the segment electrode and the common electrode by means of the segment electrode drive circuit and the common electrode drive circuit based on an image input signal from the above-mentioned image input control circuit, and controls the turning-on and turning-off of a voltage applied to the liquid crystals of the above-mentioned display unit by means of the light from the above-mentioned light sources to copy the optical image of a document into the pixel matrix of the above-mentioned display unit. In the image read mode, the display device controls the image read control circuit, image data detection circuit, and the control light source by means of the control circuit to drive the segment electrode and the common electrode by means of the segment electrode drive circuit and the common electrode drive circuit based on an image read signal from the aforementioned image read control circuit, and turns on the voltage applied to the liquid crystals of the above-mentioned display unit by means of the control light from the above-mentioned control light source to read the image data written in the above-mentioned pixel matrix as an electric signal by means of the above-mentioned image data detection circuit. In the image display mode, the display device controls the display control circuit and the display illumination light source by means of the control circuit to drive the segment electrode and the common electrode by means of the segment electrode drive circuit and the common electrode drive circuit based on the display signal from the above-mentioned display control circuit, and turns on the voltage applied to the liquid crystals of the above-mentioned display unit by means of the display illumination light from the display illumination light source to display an image corresponding to the above-mentioned display signal on the above-mentioned pixel matrix. With the above-mentioned arrangement, the display and copy operations of the optical image of the document on the pixel matrix of the above-mentioned display unit can be achieved under the control of the control circuit.

Therefore, according to the present invention, a compact integrated image input device-integrated type display device concurrently having an image display function and a document image input function can be provided.

According to an embodiment, there are employed the phase transition type liquid crystals as the above-mentioned liquid crystals. With the above-mentioned arrangement, the change of state of the liquid crystals according to the optical image of the document in the aforementioned image input mode or the change of state of the liquid crystals according to the display signal in the aforementioned image display mode can be achieved by the change of state between the Grandjean state and the focalconic state of the phase transition type liquid crystals. Furthermore, the read of the electric signal according to the image data in the aforementioned image read mode can be achieved, when a pulse is applied to one electrode of the electrodes interposing therebetween the above-mentioned phase transition type liquid crystals, by detecting the voltage signal induced at the other electrode.

Therefore, according to the present invention, a compact integrated image input device-integrated type display device concurrently having an image display function and a document image input function can be easily achieved.

According to an embodiment, there are employed n-type cholesteric liquid crystals, liquid crystals formed by mixing n-type cholesteric liquid crystals with n-type nematic liquid crystals, or smectic-A liquid crystals as the aforementioned liquid crystals. With the above-mentioned arrangement, the change of state of the liquid crystals according to the optical image of the document in the aforementioned image input mode or the change of state of the liquid crystals according to the display signal in the aforementioned image display mode can be achieved by the change of state between the Grandjean state and the focalconic state of the n-type cholesteric liquid crystals, liquid crystals formed by mixing n-type cholesteric liquid crystals with n-type nematic liquid crystals, or smectic-A liquid crystals. Furthermore, the read of the electric signal according to the image data in the aforementioned image read mode can be achieved, when a pulse is applied to one electrode of electrodes interposing therebetween the above-mentioned n-type cholesteric liquid crystals, liquid crystals formed by mixing n-type cholesteric liquid crystals with n-type nematic liquid crystals, or smectic-A liquid crystals, by detecting the voltage signal induced at the other electrode.

Therefore, according to the embodiment, a compact integrated image input device-integrated type display device concurrently having an image display function and a document image input function can be easily achieved.

According to the image input device-integrated type display device, there is provided a polarizer for controlling the polarization direction of only the light which enters from the side of the electrode which is one of the segment electrode and the common electrode of the display unit and is not electrically connected to the photoconductor before the light reaches the above-mentioned photoconductor. With the above-mentioned arrangement, the resistance of the photoconductor is controlled by the incident light from the above-mentioned electrode which is not electrically connected to the photoconductor by a combination of the polarization direction of the light which enters from the side of the above-mentioned electrode which is not electrically connected to the photoconductor and the polarizing element of the aforementioned polarizer, with which the turning-on and turning-off of the voltage applied to the liquid crystals can be controlled.

Therefore, an improved operability can be achieved in the image display operation and the document image input operation in the compact integrated image input device-integrated type display device concurrently having an image display function and a document image input function.

According to an embodiment, there are employed ferroelectric liquid crystals as the liquid crystals for use in a display unit having the aforementioned polarizer. With the above-mentioned arrangement, the change of state of the liquid crystals according to the optical image of the document in the aforementioned image input mode or the change of state of the liquid crystals according to the display signal in the aforementioned image display mode can be achieved by the change of the alignment direction of the above-mentioned ferroelectric liquid crystals.

Therefore, according to the embodiment, there can be easily achieved an image input device-integrated type display device which can control the turning-on and turning-off of the voltage applied to the liquid crystals by the incident light from the electrode which is one of the aforementioned segment electrode and the common electrode and is not electrically connected to the photoconductor.

According to an embodiment, the aforementioned image data detection circuit in the image input device-integrated type display device in which the aforementioned ferroelectric liquid crystals are inserted is designed to detect the quantity of electric charges charged according to image data at the island electrode in the aforementioned display unit. Meanwhile, the aforementioned control light source is designed to be able to scan one by one each electrode which is one of the segment electrode and the common electrode and is not electrically connected to the photoconductor. Furthermore, the control circuit is designed to detect the quantity of electric charges charged at the island electrode of the pixel relevant to one segment electrode or the common electrode selected by being irradiated by light from the aforementioned control light source in the image read mode to read the image data written in the above-mentioned pixel matrix as an electric signal. With the above-mentioned arrangement, the image data of the pixel matrix of the display unit employing the aforementioned ferroelectric liquid crystals can be easily read as an electric signal.

According to an embodiment, there is provided an input pen which emits light from a light source through its tip end. Meanwhile, the control circuit is designed to control the aforementioned image input control circuit and the control light source in the pen input mode to put the pixel matrix of the aforementioned display unit into the initial state and then drive the segment electrode and the common electrode by means of the segment electrode drive circuit and the common electrode drive circuit according to the aforementioned image input signal while turning on the voltage applied to the liquid crystals of the aforementioned display unit by means of the light from the above-mentioned input pen to change the alignment direction of the liquid crystals of the relevant pixel of the aforementioned pixel matrix. With the above-mentioned arrangement, an image can be input to the pixel matrix of the above-mentioned display unit by means of the above-mentioned input pen.

Therefore, according to the embodiment, a compact integrated image input device-integrated type display device concurrently having an image display function, a document image input function, and a pen input function can be provided.

According to an embodiment, there is provided a micro lens on one of the two transparent substrates of the aforementioned display unit. With the above-mentioned arrangement, light which enters from the side of the transparent substrate at which the micro lens is not provided, and is irradiated on the above-mentioned display unit can be converged.

In more detail, according to the embodiment, a sufficient quantity of light can be irradiated on the aforementioned photoconductor even when the document illumination light or the light emitted from the input pen is reduced at the time when it is reflected, for example, in the aforementioned image input mode or the pen input mode. With the above-mentioned arrangement, the brightness data of the document and the position data of the input pen can be accurately written into the aforementioned pixel matrix.

According to an embodiment, at least one of the transparent substrates of the aforementioned display unit is constructed so that optical fibers each having a specified length are arranged two-dimensionally to constitute a plate-shaped optical fiber array of which axial direction is in the thickness direction of the optical fiber array. With the above-mentioned arrangement, the light which enters from the side of the optical fiber array travels through the above-mentioned optical fibers of the corresponding pixel in the axial direction of the optical fibers.

Therefore, according to the embodiment, an image input device-integrated type display device capable of efficiently executing the operation of each of the aforementioned modes without cross-talk between pixels constituting the pixel matrix of the above-mentioned display unit nor loss in quantity of light.

According to an embodiment, the aforementioned display illumination light source, document illumination light source, and control light source are provided by one plate-shaped light source, and a side portion of the plate-shaped light source is pivotally mounted to a side portion of the aforementioned display unit. With the above-mentioned arrangement, the above-mentioned display unit can be illuminated by the above-mentioned one plate-shaped light source from the front side or the back side of the display unit at need.

Therefore, according to the embodiment, the display illumination light source, document illumination light source, and control light source can be concurrently served by only one plate-shaped light source to allow an integrated image input device-integrated type display device concurrently having at least an image display function and a document image input function to be further compacted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image input device-integrated type display device comprising:

a display unit having a plurality of transparent segment electrodes arranged in parallel with each other on a transparent substrate; a plurality of transparent common electrodes arranged in parallel with each other on another transparent substrate, said common electrodes being perpendicular to said segment electrodes, a photoconductor electrically connected to either the segment electrode or the common electrode and arranged in a pixel composed of an area of intersection between the segment electrode and the common electrode, a transparent island electrode electrically connected to the photoconductor and arranged in between the segment electrode and the common electrode relevant to the pixel, liquid crystals interposed between the island electrode and an electrode which is one of the segment electrode and the common electrode and is not electrically connected to the photoconductor, and a light shielding film for shielding only light entering from the side of the electrode which is one of the segment electrode and the common electrode and is not electrically connected to the photoconductor so that the light does not reach the photoconductor;

a display illumination light source which radiates display illumination light in displaying an image on a pixel matrix composed of areas of intersections between the plural segment electrodes and the plural common electrodes of the display unit;

a document illumination light source which radiates document illumination light in copying an optical image of a document into the pixel matrix of the display unit;

a control light source which radiates control light for optically controlling turning-on and turning-off of a voltage to be applied to liquid crystals of the display unit;

a display control circuit which generates a display signal for displaying an image on the pixel matrix of the display unit;

an image input control circuit which generates an image input signal for copying an optical image of the document into the pixel matrix of the display unit;

an image read control circuit which generates an image read signal for reading image data written in the liquid crystals of each pixel constituting the pixel matrix of the display unit in the form of an electric signal;

a segment electrode driving circuit which drives the segment electrode based on the display signal from the display control circuit, the image input signal from the image input control circuit, or the image read signal from the image read control circuit;

a common electrode driving circuit which drives the common electrode based on the display signal from the display control circuit, the image input signal from the image input control circuit, or the image read signal from the image read control circuit;

an image data detection circuit which detects the image data written in the pixel matrix of the display unit in the form of an electric signal; and a control circuit which copies the optical image of the document into the pixel matrix by controlling the image input control circuit, the document illumination light source, and the control light source in an image input mode, reads the image data written in the pixel matrix in the form of an electric signal by controlling the image read control circuit, the image data detection circuit, and the control light source in an image read mode, and displays an image on the pixel matrix by controlling the display control circuit and the display illumination light source in an image display mode.

2. An image input device-integrated type display device as claimed in claim 1, wherein phase transition type liquid crystals having a storage function are used as the liquid crystals.

3. An image input device-integrated type display device as claimed in claim 1, wherein n-type cholesteric liquid crystals, liquid crystals formed by mixing n-type cholesteric liquid crystals with n-type nematic liquid crystals, or smectic-A liquid crystals having a storage function are used as the liquid crystals.

4. An image input device-integrated type display device comprising:

a display unit having a plurality of transparent segment electrodes arranged in parallel with each other on a transparent substrate; a plurality of transparent common electrodes arranged in parallel with each other on another transparent substrate, said common electrodes being perpendicular to said segment electrodes, a photoconductor electrically connected to either the segment electrode or the common electrode and arranged in a pixel composed of an area of intersection between the segment electrode and the common electrode, a transparent island electrode electrically connected to the photoconductor and arranged in between the segment electrode and the common electrode relevant to the pixel, liquid crystals interposed between the island electrode and an electrode which is one of the segment electrode and the common electrode and is not electrically connected to the photoconductor, and a polarizer for controlling a polarization direction of only light entering from a side of the electrode which is one of the segment electrode and the common electrode and is not electrically connected to the photoconductor, said light being able to reach the photoconductor when the light passed through the polarizer;

a display illumination light source which radiates display illumination light in displaying an image on a pixel matrix composed of areas of intersections between the plural segment electrodes and the plural common electrodes of the display unit;

a document illumination light source which radiates document illumination light in copying an optical image of a document into the pixel matrix of the display unit;

a control light source which radiates control light for optically controlling turning-on and turning-off of a voltage to be applied to liquid crystals of the display unit;

a display control circuit which generates a display signal for displaying an image on the pixel matrix of the display unit;

an image input control circuit which generates an image input signal for copying an optical image of the document into the pixel matrix of the display unit;

an image read control circuit which generates an image read signal for reading image data written in the liquid crystals of each pixel constituting the pixel matrix of the display unit in the form of an electric signal;

a segment electrode driving circuit which drives the segment electrode based on the display signal from the display control circuit, the image input signal from the image input control circuit, or the image read signal from the image read control circuit;

a common electrode driving circuit which drives the common electrode based on the display signal from the display control circuit, the image input signal from the image input control circuit, or the image read signal from the image read control circuit;

an image data detection circuit which detects the image data written in the pixel matrix of the display unit in the form of an electric signal; and a control circuit which copies the optical image of the document into the pixel matrix by controlling the image input control circuit, the document illumination light source, and the control light source in an image input mode, reads the image data written in the pixel matrix in the form of an electric signal by controlling the image read control circuit, the image data detection circuit, and the control light source in an image read mode, and displays an image on the pixel matrix by controlling the display control circuit and the display illumination light source in an image display mode.

5. An image input device-integrated type display device as claimed in claim 4, wherein
ferroelectric liquid crystals are used as the liquid crystals.

6. An image input device-integrated type display device as claimed in claim 5, wherein
the image data detection circuit detects a quantity of electric charges charged according to the image data at the island electrode of each pixel constituting the pixel matrix of the display unit,
the control light source can irradiate light one by one on each electrode which is one of the segment electrode and the common electrode and is not electrically connected to the photoconductor, and
the control circuit reads the image data written in pixel matrix in the form of an electric signal by detecting a quantity of electric charges charged at the island electrode of the pixel relevant to the one segment electrode or common electrode which is selected by being irradiated by light of the control light source in the image read mode.

7. An image input device-integrated type display device as claimed in claim 1, further comprising an input pen which has a light source and emits light from the light source outwardly through its tip end, and wherein
the control circuit controls the image input control circuit and the control light source in a pen input mode to allow an image input by means of the input pen to be written into the pixel matrix.

8. An image input device-integrated type display device as claimed in claim 4, further comprising an input pen which has a light source and emits light from the light source outwardly through its tip end, and wherein
the control circuit controls the image input control circuit and the control light source in a pen input mode to allow an image input by means of the input pen to be written into the pixel matrix.

9. An image input device-integrated type display device as claimed in claim 1, wherein
one of the two transparent substrates of the display unit is provided with a micro lens for condensing incident light thereto.

10. An image input device-integrated type display device as claimed in claim 4, wherein
one of the two transparent substrates of the display unit is provided with a micro lens for condensing incident light thereto.

11. An image input device-integrated type display device as claimed in claim 1, wherein
at least one of the two transparent substrates of the display unit is comprised of a plate-shaped optical fiber array where optical fibers each having a specified length are arranged two-dimensionally with axial directions of the optical fibers extended in a thickness direction of the optical fiber array.

12. An image input device-integrated type display device as claimed in claim 4, wherein
at least one of the two transparent substrates of the display unit is comprised of a plate-shaped optical fiber array where optical fibers each having a specified length are arranged two-dimensionally with axial directions of the optical fibers extended in a thickness direction of the optical fiber array.

13. An image input device-integrated type display device as claimed in claim 1, wherein
the display illumination light source, the document illumination light source, and the control light source are comprised of one plate-shaped light source, and a side portion of the plate-shaped light source is pivotally mounted to a side portion of the display unit.

14. An image input device-integrated type display device as claimed in claim 4, wherein
the display illumination light source, the document illumination light source, and the control light source are comprised of one plate-shaped light source, and a side portion of the plate-shaped light source is pivotally mounted to a side portion of the display unit.

* * * * *